United States Patent
Faris et al.

(10) Patent No.: US 6,558,829 B1
(45) Date of Patent: May 6, 2003

(54) APPLIANCE WITH REFUELABLE AND RECHARGEABLE METAL-AIR FUEL CELL BATTERY POWER SUPPLY UNIT INTEGRATED THEREIN

(75) Inventors: Sadeg M. Faris, Pleasantville, NY (US); Tsepin Tsai, Chappaqua, NY (US)

(73) Assignee: Reveo, Inc., Elmsford, NY (US)

( * ) Notice: Subject to any disclaimer, the term of this patent is extended or adjusted under 35 U.S.C. 154(b) by 45 days.

(21) Appl. No.: 09/695,697

(22) Filed: Oct. 24, 2000

Related U.S. Application Data

(63) Continuation-in-part of application No. 09/414,874, filed on Jul. 19, 2000, now Pat. No. 6,451,463, and a continuation-in-part of application No. 09/167,148, filed on Oct. 6, 1998, now Pat. No. 6,348,277, and a continuation-in-part of application No. 09/116,643, filed on Oct. 6, 1998, now Pat. No. 6,306,534, and a continuation-in-part of application No. 09/164,063, filed on Sep. 30, 1998, now Pat. No. 6,239,508, and a continuation-in-part of application No. 09/143,895, filed on Aug. 31, 1998, now Pat. No. 6,309,771, and a continuation-in-part of application No. 09/143,889, filed on Aug. 31, 1998, now Pat. No. 6,383,673, and a continuation-in-part of application No. 09/133,166, filed on Aug. 12, 1998, now Pat. No. 6,403,244, and a continuation-in-part of application No. 09/232,326, filed on Aug. 10, 1998, now Pat. No. 6,365,292, and a continuation-in-part of application No. 09/232,327, filed on Aug. 10, 1998, now Pat. No. 6,218,034, and a continuation-in-part of application No. 09/232,328, filed on Aug. 10, 1998, now Pat. No. 6,190,792, and a continuation-in-part of application No. 09/130,341, filed on Aug. 6, 1998, now Pat. No. 6,287,715, and a continuation-in-part of application No. 09/130,325, filed on Aug. 6, 1998, and a continuation-in-part of application No. 09/126,213, filed on Jul. 30, 1998, now Pat. No. 6,312,844, and a continuation-in-part of application No. 09/120,583, filed on Jul. 22, 1998, now Pat. No. 6,410,174, and a continuation-in-part of application No. 09/112,596, filed on Jul. 9, 1998, now Pat. No. 6,228,519, said application No. 09/143,895, and application No. 09/143,889, each is a continuation of application No. 08/944,507, filed on Oct. 6, 1997, now Pat. No. 6,296,960, said application No. 09/232,326, and application No. 09/232,327, and application No. 09/232,328, each is a continuation of application No. 09/110,762, filed on Jul. 3, 1998, now Pat. No. 6,299,997.

(51) Int. Cl.[7] .................. H01M 12/06; H01M 8/04; H01M 16/00

(52) U.S. Cl. .................. 429/27; 429/22; 320/101
(58) Field of Search .................. 429/27, 22; 320/101

(56) References Cited

U.S. PATENT DOCUMENTS

| | | |
|---|---|---|
| 3,252,838 A | 5/1966 | Huber et al. |
| 3,260,620 A | 7/1966 | Gruber |

(List continued on next page.)

FOREIGN PATENT DOCUMENTS

| GB | 1176488 | 1/1970 | .......... H01M/29/02 |

OTHER PUBLICATIONS

Convert 3V to 5V Without Inductors by , Maxim Integrated Products; http://www.maxim-ic.com, vol. 92, 2000, p. 1–3 (Month Unknown).

(List continued on next page.)

*Primary Examiner*—Stephen Kalafut
(74) *Attorney, Agent, or Firm*—Thomas J. Perkowski, Esq., P.C.; Ralph J. Crispino

(57) ABSTRACT

A device/system having an integrated refuelable and rechargable metal-air FCB based power supply unit for generating and providing electrical power to at least one electrical-energy-consuming load device disposed therein. An external power source is used to recharge the metal-air FCB subsystems embodied therein. A control subsystem automatically transitions between discharging mode (wherein at least one metal-air FCB subsystem supplies electrical power to the electrical power-consuming load device) and a recharging mode (wherein the external power source is electrically coupled to at least one metal-air FCB subsystem to thereby recharge the metal-air FCB subsystem(s). The metal-air FCB subsystem(s) are refueled by manually loading and unloading metal-fuel from the metal-air FCB subsystem(s). Preferably, electrical power provided to the at least one electrical power-consuming load device is supplied solely by electrical power generated by discharging metal-fuel in the metal-air fuel cell battery subsystem(s). In addition, the metal-air FCB subsystem(s) preferably has a modular architecture that enable flexible and user-friendly operations in loading of metal-fuel, unloading of consumed metal-fuel, replacement of the ionic-conducting medium, and replacement of the cathode.

46 Claims, 13 Drawing Sheets

U.S. PATENT DOCUMENTS

| | | |
|---|---|---|
| 3,357,864 A | 12/1967 | Huber |
| 3,432,354 A | 3/1969 | Jost |
| 3,436,270 A | 4/1969 | Oswin et al. |
| 3,454,429 A | 7/1969 | Gruber ..................... 136/86 |
| 3,532,548 A | 10/1970 | Stachurski |
| 3,536,535 A | 10/1970 | Lippincott |
| 3,577,281 A | 5/1971 | Pountney et al. |
| 3,663,298 A | 5/1972 | McCoy et al. |
| 3,717,505 A | 2/1973 | Unkle, Jr. et al. |
| 3,822,149 A | 7/1974 | Hale |
| 3,845,835 A | 11/1974 | Petit |
| 3,909,685 A | 9/1975 | Baker et al. |
| 3,928,072 A | 12/1975 | Gerbler et al. |
| 3,963,519 A | 6/1976 | Louie |
| 3,977,901 A | 8/1976 | Buzzelli |
| 4,052,541 A | 10/1977 | von Krusenstierna |
| 4,152,489 A | 5/1979 | Chottiner |
| 4,172,924 A | 10/1979 | Warszawski |
| 4,246,324 A | 1/1981 | de Nora et al. |
| 4,331,742 A | 5/1982 | Lovelace et al. |
| 4,341,847 A | 7/1982 | Sammells |
| 4,551,399 A | 11/1985 | Despic |
| 4,560,626 A | 12/1985 | Joy |
| 4,626,482 A | 12/1986 | Hamien et al. |
| 4,689,531 A | 8/1987 | Bacon |
| 4,693,946 A | 9/1987 | Niksa et al. |
| 4,714,662 A | 12/1987 | Bennett |
| 4,828,939 A | 5/1989 | Turley et al. |
| 4,913,983 A | 4/1990 | Cheiky |
| 4,916,036 A | 4/1990 | Cheiky |
| 4,950,561 A | 8/1990 | Niksa et al. |
| 4,957,826 A | 9/1990 | Cheiky |
| 4,968,396 A | 11/1990 | Harvey |
| 5,121,044 A | 6/1992 | Goldman |
| 5,185,218 A | 2/1993 | Brokman et al. |
| 5,190,833 A | 3/1993 | Goldstein et al. |
| 5,196,275 A | 3/1993 | Goldman et al. |
| 5,242,765 A | 9/1993 | Naimer et al. |
| 5,250,370 A | 10/1993 | Faris |
| 5,260,144 A | 11/1993 | O'Callaghan |
| 5,306,579 A | 4/1994 | Shepard, Jr. et al. |
| 5,312,701 A | 5/1994 | Khasin et al. |
| 5,318,861 A | 6/1994 | Harats et al. |
| 5,328,777 A | 7/1994 | Bentz |
| 5,328,778 A | 7/1994 | Woodruff |
| 5,354,625 A | 10/1994 | Bentz et al. |
| 5,360,680 A | 11/1994 | Goldman et al. |
| 5,362,577 A | 11/1994 | Pedicini |
| 5,366,822 A | 11/1994 | Korall et al. |
| 5,387,477 A | 2/1995 | Cheiky |
| 5,389,456 A | 2/1995 | Singh et al. |
| 5,405,713 A | 4/1995 | Pecherer et al. |
| 5,411,592 A | 5/1995 | Ovshinsky et al. |
| 5,418,080 A | 5/1995 | Korall et al. |
| 5,439,758 A | 8/1995 | Stone et al. |
| 5,447,805 A | 9/1995 | Harats et al. |
| 5,462,816 A | 10/1995 | Okamura et al. |
| 5,486,429 A | 1/1996 | Thibault |
| 5,512,384 A | 4/1996 | Celeste et al. |
| 5,525,441 A | 6/1996 | Reddy et al. |
| 5,532,086 A | 7/1996 | Thibault et al. |
| 5,536,592 A | 7/1996 | Celeste et al. |
| 5,554,452 A | 9/1996 | Delmolino et al. |
| 5,569,551 A | 10/1996 | Pedicini et al. |
| 5,582,931 A | 12/1996 | Kawahami |
| 5,599,637 A | 2/1997 | Pecherer et al. |
| 5,691,074 A | 11/1997 | Pedicini |
| 5,711,648 A | 1/1998 | Hammerslag |
| 5,721,064 A | 2/1998 | Pedicini et al. |
| 5,726,551 A | 3/1998 | Miyazaki et al. |
| 5,756,228 A | 5/1998 | Roseanou |
| 5,771,476 A | 6/1998 | Mufford et al. |
| 5,904,999 A | 5/1999 | Kimberg et al. |
| 5,978,283 A | 11/1999 | Hsu et al. |
| 6,057,052 A | 5/2000 | Shrim et al. |
| 6,236,185 B1 * | 5/2001 | Hines et al. ................. 320/101 |
| 6,326,763 B1 * | 12/2001 | King et al. .................. 320/101 |
| 6,384,570 B2 * | 5/2002 | Matsuyama ................. 320/101 |

OTHER PUBLICATIONS

Derive 5V From Four AA Cells by , Maxim Integrated Products; http://www.maxim–ic.com, vol. 128, 2000, p. 1–2 (Month Unknown).

Boost/Linear Regulator Derives 5B From Four Cells by , Maxim Integrated Products, http://www.maxim–ic.com, 2000 (Month Unknown).

Fuel Cell Technology & Applications, http://www.metallicpower.com/rtfuel.htm by , Metallic Power, Inc., 1999 (Month N/A).

Fuel Cells and Their Applications by Karl Kordesch and Gunter Simader, VCH Publishers, Inc., New York NY, Chapters 4.8.1–4.8.2, 1996, p. 158–162 (Month N/A).

Fabrication of Thin–Film LIMN204 Cathodes for Rechargeable Microbateries by F.K. Shokoohi, et al., Applied Physics Letters, 1991, p. 1260–1262 (Sep.).

New Age EVs by Herb Schuldner, Popular Mechanics, 1991, p. 27–29 (Sep.).

Battery Chargers by Mike Allen, Popular Mechanics, 1991, p. 30–31 (Sep.).

Marketing Study for AER Energy Resources, Inc. by Authors not indicated, AER Energy Resources, Inc., 1991, p. 6–28 (May).

Electric Car Showdown in Phoenix by Rick Cook, Popular Science, 1991, p. 64–65,82 (Jul.).

LBL Researchers Work on New Generation of Batteries by Jeffery Kahn, www.lbl.gov/Science–Articles/Archive/battery–development–at–lbl.html, 1990, p. 1–6 (Month Unknown).

Batteries for Cordless Appliances by Ralph J. Brodd, Ch. 3 of Batteries for Cordless Appliances, 1987, p. 49–59 (Month Unknown).

PCT/US98/21257 Search Report, (Apr. 1999).
PCT/US98/21260 Search Report, (Feb. 1999).
PCT/US98/21256 Search Report, (Feb. 1999).

* cited by examiner

APPLIANCE WITH REFUELABLE AND RECHARGEABLE METAL-AIR FUEL CELL BATTERY POWER SUPPLY UNIT INTEGRATED THEREIN

RELATED CASES

This Application is related to U.S. patent application Ser. No. 09/695,698 entitled "Refuelable And Rechargeable Metal-Air Fuel Cell Battery Power Supply Unit For Integration Into An Appliance., and to U.S. patent application Ser. No. 09/695,699 entitled "POWER GENERATION AND DISTRIBUTION SYSTEM/NETWORK HAVING INTERRUPTABLE POWER SOURCE AND REFUELABLE AND RECHARGEABLE METAL-AIR FUEL CELL BATTERY SUBSYSTEM", filed concurrently herewith, and is a Continuation-in-Part of the following U.S. Applications: application Ser. No. 09/414,874 entitled "Electro-Chemical Power Generation Systems Employing Arrays Of Electronically-Controllable Discharging And/Or Recharging Cells Within A Unity Support Structure" filed Jul. 19, 2000, now U.S. Pat. No. 6,451,463; application Ser. No. 09/167,148 entitled "Metal-Air FCB-Based Power Producing Modules And Metal-Fuel Card And Cathode Cartridges For Use Therewith" by Sadeg M. Faris and Tsepin Tsai filed Oct. 6, 1998, now U.S. Pat. No. 6,348,277; application Ser. No. 09/143,895 entitled "Metal-Air Fuel Cell Battery System Employing Metal Fuel Cards", now U.S. Pat. No. 6,309,771, and Ser. No. 09/143,889 entitled "Metal-Fuel Card Construction For Use In Metal-Air Fuel Cell Battery Systems", now U.S. Pat. No. 6,383,673, each filed Aug. 31, 1998 and each being a Continuation of application Ser. No. 08/944,507 entitled "System And Method For Producing Electrical Power Using Metal-Air Fuel Cell Battery Technology" by Sadeg Faris, et al. filed Oct. 6, 1997, now U.S. Pat. No. 6,296,960; application Ser. No. 09/112,596 entitled "Metal-Air Fuel Cell Battery System Having Mechanism For Extending The Path-Length Of Metal-Fuel Tape During Discharging And Recharging Modes Of Operation" by Sadeg M. Faris and Tsepin Tsai filed Jul. 9, 1998, now U.S. Pat. No. 6,228,519; application Ser. No. 09/232,328 entitled "Ionically Conductive Belt Structure For Use In A Metal-Air Fuel-Cell Battery System And Method Of Fabricating The Same" by Sadeg M. Faris et al. filed Aug. 10, 1998, now U.S. Pat. No. 6,190,792; and application Ser. No. 09/232,327 entitled "Cathode Cylinder For Use In Metal-Air Fuel Cell Battery Systems And Method Of Fabricating The Same" by Sadeg M. Faris filed Aug. 10, 1998, now U.S. Pat. No. 6,218,034 and application Ser. No. 09/232,326 entitled "Cathode Belt Structure For Use In A Metal-Air Fuel-Cell Battery System And Method Of Fabricating The Same" by Sadeg M. Faris et al., filed Aug. 10, 1998, now U.S. Pat. No. 6,365,292; each being a Continuation of application Ser. No. 09/110,762 entitled "Metal-Air Fuel Cell Battery System Employing Metal-Fuel Tape And Low-Friction Cathode Structures" by Sadeg M. Faris et al., filed Jul. 3, 1998, now U.S. Pat. No. 6,299,997; application Ser. No. 09/126,213 entitled "Metal-Air Fuel-Cell Battery System Having Means For Discharging And Recharging Metal-Fuel Cards Supplied From A Cassette-Type Storage Device" by Sadeg M. Faris, filed Jul. 30, 1998, now U.S. Pat. No. 6,312,844 which is a Continuation of application Ser. No. 09/074,337 entitled "Metal-Air Fuel-Cell Battery Systems" by Sadeg M. Faris and Le Li, filed May 7, 1998; application Ser. No. 09/130,341 entitled "Metal-Air Fuel Cell Battery System Having Means For Means For Managing Controlling Discharging And Recharging Parameters In Real-Time For Improved Operating Efficiency" by Sadeg M. Faris and Tsepin Tsai filed Aug. 6, 1998, now U.S. Pat. No. 6,287,715; application Ser. No. 09/130,325 entitled "Metal-Air Fuel Cell Battery System With Means For Recording And Reading Operating Parameters During Discharging And Recharging Modes Of Operation" by Sadeg M. Faris and Tsepin Tsai, filed Aug. 6, 1998; application Ser. No. 09/116,643 entitled "Metal-Air Fuel Cell Battery System Having Means For Simultaneously Discharging And Recharging A Plurality Of Metal-Fuel Cards" by Sadeg M. Faris et al., filed on Oct. 6, 1998, now U.S. Pat. No. 6,306,534; application Ser. No. 09/120,583 entitled "Metal-Air Fuel Cell Battery System Having Bi-Directional Transport for Metal-Fuel Tape And Management Of Metal-Fuel Tape Therealong" by Sadeg M. Faris filed Jul. 22, 1998, now U.S. Pat. No. 6,410,174; application Ser. No. 09/164,063 entitled "Electrical Power Generation System Having Means For Managing The Availability Of Metal-Fuel Among A Network Of Metal-Air Fuel Cell Battery Systems" by Sadeg M. Faris, filed Sep. 30, 1998, now U.S. Pat. No. 6,239,508; application Ser. No. 09/133,166 entitled "Metal-Air Fuel Cell Battery System Employing Hydrostatic Forces To Enable Simultaneous Transport Of Metal-Fuel Tape, Moveable Cathode Structure, And Ionically-Conductive Medium Therethrough During System Operation" by Sadeg M. Faris et al., filed Aug. 12, 1998, now U.S. Pat. No. 6,403,244, which is a Continuation of application Ser. No. 09/110,761 entitled "Metal-Air Fuel Cell Battery System Employing A Plurality Of Moving Cathodes Structures For Improved Volumetric Power Density" by Sadeg M. Faris et al., filed Jul. 3, 1998, now U.S. Pat. No. 6,335,111; each said application being assigned to Reveo, Inc. and incorporated herein by reference in its entirety.

BACKGROUND OF THE INVENTION

1. Field of the Invention

The present invention relates to improved methods and systems for electrochemically producing electrical power using metal-air fuel cell battery (FCB) technology.

2. Description of the Related Art

An ever-expanding range of electrical systems and devices are vital to the normal continuation of daily life for individuals and businesses in today's society. Such systems and devices include portable devices (radio/tape/CD/DVD systems, PDA devices, notebook computers, cell phones, video equipment, calculators, fans, lawn mowers, screw drivers, drills, saws), appliances (refrigerators, freezers, air conditioners, toasters, televisions, audio equipment, washing machines, ovens, stoves, and furnaces), transportation devices (power passenger vehicles, buses, golf carts, motorcycles, boats, etc), computer processing and telecommunication equipment (servers, desktop computers, communication routing and switching systems) and the electrical infrastructure in homes, schools, factories, and office buildings.

Traditionally, the utility-maintained power grid provides power to these vital systems and devices. However, the reliability of this power grid is fragile and can be compromised by unpredictable severe weather (snow/ice storms, earthquakes, tornadoes, hurricanes), system failure (excessive demand, lack of supply of natural gas to generation systems) and/or human error.

For example, during the week of Jan. 5, 1998, a severe freezing-rain storm hit Canada and the northeastern United States as warm moist air from the Gulf of Mexico encountered cold Arctic air in three Canadian provinces and in northern New York, Vermont, New Hampshire, and Maine. Ice accumulation on trees and overhead lines caused hundreds of millions of dollars of damage in both the United States and Canada and left hundreds of thousands of people without power for periods ranging from a few hours to more than three weeks. In the United States the President declared disasters in five New York counties, six Vermont counties, and all New Hampshire and Maine counties except along the coast.

In another example, during the unusually hot summer of 1988, the power infrastructure of Auckland, New Zealand unpredictably could not handle the stress caused by the extreme demand, and the aging underground transmission cables that were vital to feeding the city with electricity failed in succession. Full service was not restored for five to eight weeks.

Thus, previous failures of the power grid have shown that the disruptions caused by such failures can be massive, especially if the failures are prolonged.

Alternate forms of power generation systems have been proposed as the primary source of power (and, possibly, the auxiliary source of power) for the broad range of electrical systems and devices used by individuals and businesses in today's society. These alternate forms of power generation systems include, for example, solar-powered generation systems, wind-powered generation systems, and hydroelectric generation systems. However, the reliability of many of these alternate power generation systems is also fragile. For example, the supply of power from solar-powered generation systems/wind-powered generation systems/hydroelectric generation systems can be unpredictably interrupted for prolonged periods of time due to weather conditions (lack of sunlight/lack of wind/severe drought conditions).

In such systems, interruptions can lead to unwanted disruptions, especially if the interruptions are prolonged.

Traditionally, auxiliary power generation devices using batteries, gasoline engines or diesel engines are used to provide backup power in the event that such a prolonged interruption occurs in the utility-maintained power grid (or other primary power source). These systems too have serious limitations.

More specifically, auxiliary power generation devices that use conventional battery technology (lead acid, nickel-cadmium, or nickel-metal hydrides) have limited operation time, long recharge time, and low energy density; thus making such devices impractical for many applications. Moreover, replacement of such batteries is costly and raises numerous environmental hazards (that typically are dealt with using special encapsulation containers and careful disposal).

Similarly, auxiliary power generation devices that use combustible fuel (such as gasoline and diesel engine generators) are costly, heavy, loud, emit noxious gases and fumes; thus making such devices impractical for many applications. Moreover, such devices raise numerous environmental and safety hazards related to the transportation and use of the combustible fuels used therein.

Thus, there is a great need in the art to provide a reliable (i.e., not susceptible to prolonged interruption), efficient, user friendly, environment friendly and safe source of power for the broad range of electrical systems and devices that are vital to individuals and businesses in today's society.

OBJECTS AND SUMMARY OF THE INVENTION

Accordingly, a prime object of the present invention is to substitute the traditional power supply units and methodologies (typically, one or more switching power regulators) integrated in an electrical system or device with an integrated power supply unit comprising one or more rechargeable and refuelable metal-air FCB-based subsystems. This solution is, energy efficient, environmentally-friendly, and reliable, thus enabling consumers to use the system/device without the risk and limitations of prolonged interruption. Moreover, the solution is cost-effect because it eliminates the need for auxiliary power generation systems by integrating the rechargeable and refuelable metal-air FCB-based subsystem into the system/device. The electrical system or device may be a computer processing apparatus, a portable electronic device (such as radio, disc player, other music playing devices, camcorder, other video playing/recording devices, telephone, PDA, other communication devices), an appliance (such as television, audio equipment, washing machine, refrigerator, freezer, oven, stove, furnace, air conditioner) or an electrically-powered tool.

Another object of the present invention is to provide improved systems, apparatus and methods for electrochemically providing electrical power to electrical devices and systems while overcoming all of the limitations of known battery and conventional power generating technologies.

Another object of the present invention is to provide an appliance with a refuelable and rechargable power supply unit integrated therein.

Another object of the present invention is to provide an appliance with a system housing and a refuelable and rechargable metal-air based power supply unit integrated into the system housing.

Another object of the present invention is to provide an appliance and integrated refuelable and rechargable metal-air FCB based power supply unit, wherein the power supply unit comprises a control subsystem that automatically transitions between discharging mode and recharging mode for the metal-air FCB subsystems therein.

Another object of the present invention is to provide an appliance and integrated refuelable and rechargable metal-air FCB based power supply unit, wherein supply of electrical power to the electrical power-consuming load device in the appliance is supplied solely by a metal-air fuel cell battery subsystem.

Another object of the present invention is to provide an appliance and integrated refuelable and rechargable metal-air FCB based power supply unit, wherein electrical power provided to the electrical power-consuming load device in the appliance is supplied solely by electrical power generated by discharging metal-fuel in a metal-air fuel cell battery subsystem.

Another object of the present invention is to provide an appliance and integrated refuelable and rechargable metal-air FCB based power supply unit, wherein an input power bus and output power bus are both coupled to a metal-air fuel cell battery subsystem, the input power bus providing an electrical connection from an external power source to the metal-fuel cell battery subsystem in the recharging mode to thereby recharge the metal-air fuel cell battery system, and the output power bus providing an electrical connection from the metal-fuel cell battery subsystem to the electrical power-consuming load device(s) in the appliance in the discharging mode to thereby provide electrical power to the electrical power-consuming load device(s). The metal-air fuel cell battery subsystem may comprise a network of metal-air fuel cell modules each comprising one or more metal-air fuel cells.

Another object of the present invention is to provide an appliance and integrated refuelable and rechargable metal-air FCB based power supply unit, wherein the metal-air fuel cell battery subsystem comprises a network of metal-air fuel cell modules each comprising one or more metal-air fuel cells, and a switching network, under control of a control subsystem, that selectively couples the input power bus and output power bus to the power terminals of the network (and that selectively couples together the power terminals of the network).

Another object of the present invention is to provide a metal-air FCB system that enables efficient, automated, flexible and user-friendly refueling operations in such metal-air FCB systems, and the replacement of cathode elements and ionically conducting medium by consumers.

Another object of the present invention is to provide a metal-air fuel cell battery (FCB) system, wherein metal-fuel is provided within a modular housing that is manually insertable/removable within an aperture of the metal-air FCB system, to thereby enable efficient, flexible and user-friendly refueling operations of such metal-air FCB systems by consumers.

Another object of the present invention is to provide a metal-air fuel cell battery (FCB) system, wherein cathode structures are provided within a modular housing that is manually insertable/removable within an aperture of the metal-air FCB system, to thereby enable efficient, flexible and user-friendly replacement of cathode elements in such metal-air FCB systems by consumers.

Another object of the present invention is to provide a metal-air FCB system, wherein metal-fuel cards are manually insertable/removable within an aperture of the metal-air FCB system, to thereby enable efficient, flexible and user-friendly replacement of metal-fuel cards in such metal-air FCB systems by consumers.

Another object of the present invention is to provide a metal-air fuel cell battery (FCB) system, wherein a card structure comprising cathode elements is manually insertable/removable within an aperture of the metal-air FCB system, to thereby provide efficient, flexible and user-friendly operations that are suitable for consumers in replacing cathode elements of such metal-air FCB systems.

Another object of the invention is to provide a metal-air FCB system wherein metal-fuel tape is housed in a cassette-type cartridge that is manually insertable/removable within an aperture of a metal-air FCB system, to thereby provide efficient, flexible and user-friendly operations that are suitable for consumers in replacing the metal-fuel tape of such metal-air FCB systems.

Another object of the invention is to provide a metal-air FCB system wherein metal fuel paste is housed in a modular container that is manually insertable/removable within an aperture of a metal-air FCB system, to thereby enable efficient, flexible and user-friendly replacement of the metal-fuel paste in such metal-air FCB systems by consumers.

Another object of the present invention is to provide a metal-air fuel cell battery (FCB) system, wherein a modular structure including a cathode element (that interfaces to a metal-fuel paste container) is manually insertable/removable within an aperture of the metal-air FCB system, to thereby enable efficient, flexible and user-friendly replacement of the cathode elements in such metal-air FCB systems by consumers.

These and other objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein.

DETAILED DESCRIPTION OF THE ILLUSTRATIVE EMBODIMENTS OF THE PRESENT INVENTION

Figure 1A:
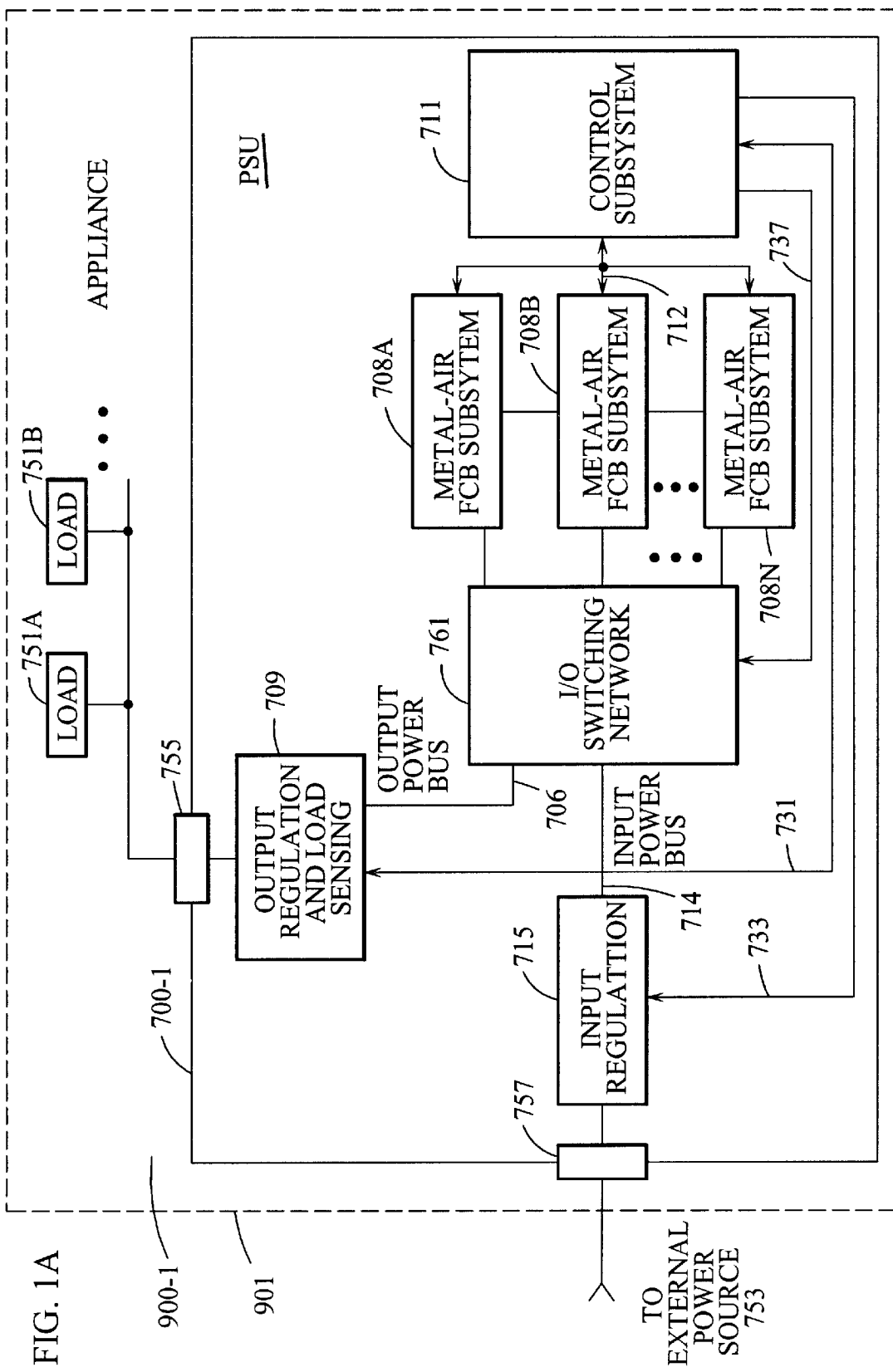
FIG. 1A is a schematic representation of a generalized embodiment of a device/system have an integrated power supply unit utilizing refuelable and rechargeable metal-air FCB technology, wherein a network of metal-air FCB subsystems are operably connected to a power bus structure and controlled by a control subsystem.

Referring now to the figures in the accompanying Drawings, the best modes for carrying out the present invention will now be described in great technical detail, wherein like elements are indicated by like reference numbers.

In general, the metal-air FCB-based systems according to the present invention load metal-fuel material, in the form cards, sheets, tape, paste and the like, to a Metal-Fuel Discharge Subsystem, or a Metal-Fuel Recharge Subsystem, depending on the mode of the system. When loaded into the Metal-Fuel Discharge Subsystem, the metal-fuel is discharged by (i.e. electro-chemically reaction with) one or more discharging heads in order produce electrical power across an electrical power-consuming load connected to the subsystem while $H_2O$ and $O_2$ are consumed at the cathode-electrolyte interface during the electro-chemical reaction. When transported to or through the Metal-Fuel Recharging Subsystem, discharged metal-fuel is recharged by one or more recharging heads in order to convert the oxidized metal-fuel material into its source metal material suitable for reuse in power discharging operations, while $O_2$ is released at the cathode-electrolyte interface during the electro-chemical reaction. The electro-chemistry upon which such discharging and recharging operations are based is described in Applicant's U.S. Pat. Nos. 6,296,960, 5,250,370, and other applied science publications well known in the art. These principles will be briefly summarized below. Also note that the Metal-Fuel Discharge Subsystem and Metal-Fuel Recharge Subsystem may utilize common components and handling systems, as is well known in the art.

During discharging operations, the Metal-Fuel Discharge Subsystem brings metal-fuel (such as zinc, aluminum, magnesium or beryllium), which is employed as an electrically-conductive anode, into "ionic-contact" with an electrically-conductive oxygen-pervious cathode structure, by way of an ionically-conducting medium. In the preferred embodiment of the present invention, the ionically-conducting medium is integrated to the metal-fuel anode structure. The ionically-conducting medium may be an ionically-conducting polymer, an electrolyte gel, or a liquid such as KOH or NaOH. When the cathode and anode structure are brought into ionic contact, a characteristic open-cell voltage is automatically generated. The value of this open-cell voltage is based on the difference in electro-chemical potential of the anode and cathode materials. When an electrical power-consuming load is connected across the cathode and anode structures of the metal-air FCB cell, so constructed, the Metal-Air Discharge Subsystem delivers electrical power to the electrical power-consuming load, as oxygen $O_2$ from the ambient environment is consumed and metal-fuel anode material oxidizes. In the case of a zinc-air FCB system or device, the zinc-oxide (ZnO) is formed on the zinc anode structure during the discharging cycle, while oxygen is consumed at within the region between the adjacent surfaces of the cathode structure and electrolytic medium (hereinafter referred to as the "cathode-electrolyte interface" for purposes of convenience).

During recharging operations, the Metal-Fuel Recharging Subsystem brings the consumed anode material (i.e., oxidized metal) into "ionic-contact" with a cathode structure, by way of the ionically-conducting medium, and applies a power source (e.g. more than 2 volts for zinc-air systems) across the cathode structure and consumed anode material. Therewhile, the Metal-Fuel Recharging Subsystem controls the electrical current flowing between the cathode and consumed anode structures, in order to reverse the electro-chemical reaction which occurred during discharging operations. In the case of the zinc-air FCB system or device, the zinc-oxide (ZnO) formed on the zinc anode structure during the discharging cycle is converted into (i.e. reduced back) into zinc, while oxygen $O_2$ is released at the cathode-electrolyte interface to the ambient environment.

After a number of discharge/recharge cycles, a refueling operation is required wherein the consumed anode material (e.g., oxidized metal) is replaced with "fresh" anode material to provide a source of metal-fuel to the metal-air FCB system.

The cathode structure(s) of the metal-air FCB system also has a limited lifetime. Generally, the cathode structure comprises an oxygen-permeable mesh of inert conductor and a catalyst for reducing oxygen that diffuses through the mesh into the system. Typically, the operational lifetime of the cathode structure(s) of the metal-air FCB system extends beyond that of a single metal-fuel anode (e.g., 10 to 50 times the operational lifetime), and thus it may be used repeatably after replacing the corresponding anode element. When the operational lifetime of the cathode element ends, it may be cost effective to replace the "spent" cathode element, or, in the alternative, to discard the metal-air FCB subsystem (or the entire FCB system) that contains the "spent" cathode element.

Generalized Embodiments of the Present Invention

According to the present invention, the traditional power supply unit (typically, one or more switching power regulators) integrated in an electrical system or device is substituted with a power supply unit comprising one or more rechargeable and refuelable metal-air FCB-based subsystems. FIG. 1A illustrates the architecture of a generalized embodiment of an exemplary device according to the present invention. As shown, the device 900-1 includes housing 901 with one or more electrical-power consuming load devices 751 (depicted as electrical power-consuming loads 751A and 751B) disposed therein. A power supply unit 700-1 comprising one or more modules integrally disposed in the housing 901 is electrically coupled to the one or more electrical power-consuming load devices 751. The one or more modules of the power supply unit 700-1 include at least one rechargeable and refuelable metal-air FCB subsystem 708 (depicted in FIG. 1A as subsystems 708A, 708B ... 708N). Each metal-air FCB subsystem 708 comprises at least one metal-air fuel cell that operates in a discharging mode to provide electrical power to the output power bus 706 for supply to the one or more electrical power-consuming load devices 751 via output port 755, and operates in a recharging mode to apply electrical power (received from one or more external electrical-power sources 753 via input port 757 and input power bus 714) across the cathode structure and consumed anode material of the metal-air fuel cell, thereby reversing the electro-chemical reaction which occurred during discharging mode of operation.

As shown in FIG. 1A, the power supply unit 700-1 of the appliance device 900-1 preferably includes output regulation and load sensing circuitry 709, electrically coupled between the output power bus 706 and the one or more electrical power-consuming load devices 709, that operates in the discharging mode to regulate the electric DC power supplied on the output power bus 706 to thereby control the output voltage levels (and, preferably the output current levels) supplied to the one or more electrical power-consuming load devices 751 of the appliance device 900-1, such that the power output from port 755 is in a form suitable for consumption by the one or more electrical power-consuming load devices 751. The output regulation and load sensing circuitry 709 may convert the DC electric power provided thereto to AC electrical power for output to the one or more electrical power-consuming load devices 751 in the event that the electrical power-consuming loads require such AC electrical power. In addition, the output regulation and load sensing circuitry 709 preferably includes circuitry for sensing real-time conditions (voltage levels or current levels) of the supply of power to the one or more electrical power-consuming load devices 751 and generating control signals indicative of such conditions. Such power regulation and sense circuitry may be realized using solid state circuitry well known the power generation and control arts.

As shown in FIG. 1A, the power supply unit 700-1 of the appliance device 900-1 preferably includes input regulation circuitry 715, coupled to the one or more external electrical-power sources 753 (for example, the utility managed and maintained grid) via input port 757, that operates in recharge mode to regulate the input voltage levels (and, preferably the input current levels) supplied thereto from the power source 753 such that it has DC signal characteristics suitable for use by the metal-air FCB subsystem(s) 708 in the recharge mode. The DC power signals generated by input regulation circuitry 715 in the recharge mode are delivered to the metal-air FCB subsystem(s) 708 over the input power bus 714. The input regulation circuitry 715 may convert the AC electric power provided thereto to DC electrical power for supply to the metal-air FCB subsystem(s) 708 in the event that the external power source(s) 753 supply AC electrical power. Such power regulation circuitry may be realized using solid state circuitry well known the power generation and control arts.

As shown in FIG. 1A, the power supply unit 700-1 preferably includes an switching network 761, coupled to the input power bus 714, the output power bus 706, and the power terminals of each metal-air fuel cell battery subsystem 708, that operates, in response to control signals from a control subsystem 711 (e.g., programmed controller) supplied via signal path 737, to: selectively couple the input power bus 714 to the power terminals of one or more metal-air fuel cell battery subsystems 708 coupled thereto; to selectively couple the output power bus 714 to the power terminals of one or more metal-air fuel cell battery subsystems 708 coupled thereto; and to selectively couple together the power terminals of two or more of the metal-air fuel cell battery subsystems 708 coupled thereto.

In general, the control subsystem 711 selectively activates any one of the metal-air FCB subsystems 708 in the discharging mode to contribute to power supplied to the one or more electrical power-consuming load device(s) 751 via output port 755 by controlling the switching network 761, via the signal path 737, to couple the power terminals (preferably, the output power terminals) of the selected metal-air FCB subsystems 708 to the output power bus 706. In addition, the control subsystem 711 selectively activates any one of the metal-air FCB subsystems 708 in the recharging mode to use power supplied by external power source(s) 753 via input port 757 by controlling the switching network 761, via the signal path 737, to couple the power terminals (preferably, the input power terminals) of the selected metal-air FCB subsystems 708 to the input power bus 714. In addition, the control subsystem 711 preferably controls the switching network (via signal path 737) to selectively couple together the power terminals of two or more of the metal-air fuel cell battery subsystems 708 coupled thereto to thereby selectively carry out multiple discharge schemes (some of which combine the power output of the FCB subsystems to provide output with current levels and/or voltage levels that cannot be provided by one of the FCB subsystems alone). Details of these output power control schemes is described in detail in U.S. Patent Application No. PCT/US98/21260, herein incorporated by reference in its entirety.

In addition, the control subsystem 711 preferably controls operation of the metal-air FCB subsystem(s) 708 within the network (e.g. by way of controlling discharging/recharging parameters during discharging/recharging modes of operation, respectively, and collecting metal-fuel and metal-oxide indicative data from the particular metal-air FCB subsystems on a real-time basis). A control bus structure 712 operably couples the control subsystem 711 to each metal-air FCB subsystem 708 (to enable the transfer of metal-fuel indicative data from the FCB subsystems to the control subsystem 711, and the transfer of control signals from the control subsystem 711 to the metal-air FCB subsystem(s) 708.

As shown in FIG. 1A, the control subsystem 711 is operably coupled to other elements of the system via signal paths that enable the exchange of control data therebetween. More specifically, the control subsystem 711 is operably coupled to the output regulation and load sensing circuitry 709 via signal path 731, and to the input regulation circuitry 715 via signal path 733.

It should be noted, that in the preferred embodiment of the present invention, the one or more electrical power-consuming load devices 751 of device/system 900-1 are supplied power solely via the discharging operation of the metal-air FCB based power supply unit 700-1 coupled thereto via output port 755, and the external power source 753 is used by the device/system solely has a power source in recharging the metal-air FCB based power supply unit 700-1.

Advantageously, the device/system of FIG. 1A and the rechargeable and refuelable metal-air FCB based power supply unit integrated therein provides improved efficiency and reliability over prior art devices/systems. More specifically, in the event that a prolonged interruption occurs in the power delivered by an external power source, such devices/systems can be used without prolonged interruption by refueling the metal-air FCB based power supply unit integrated therein, if need be. Moreover, the environmental and safety hazards, costs, unfriendly noises and other limitations associated with the prior forms of auxiliary power generation (based upon conventional battery technology and combustible fuel) are avoided.

Figure 1B:
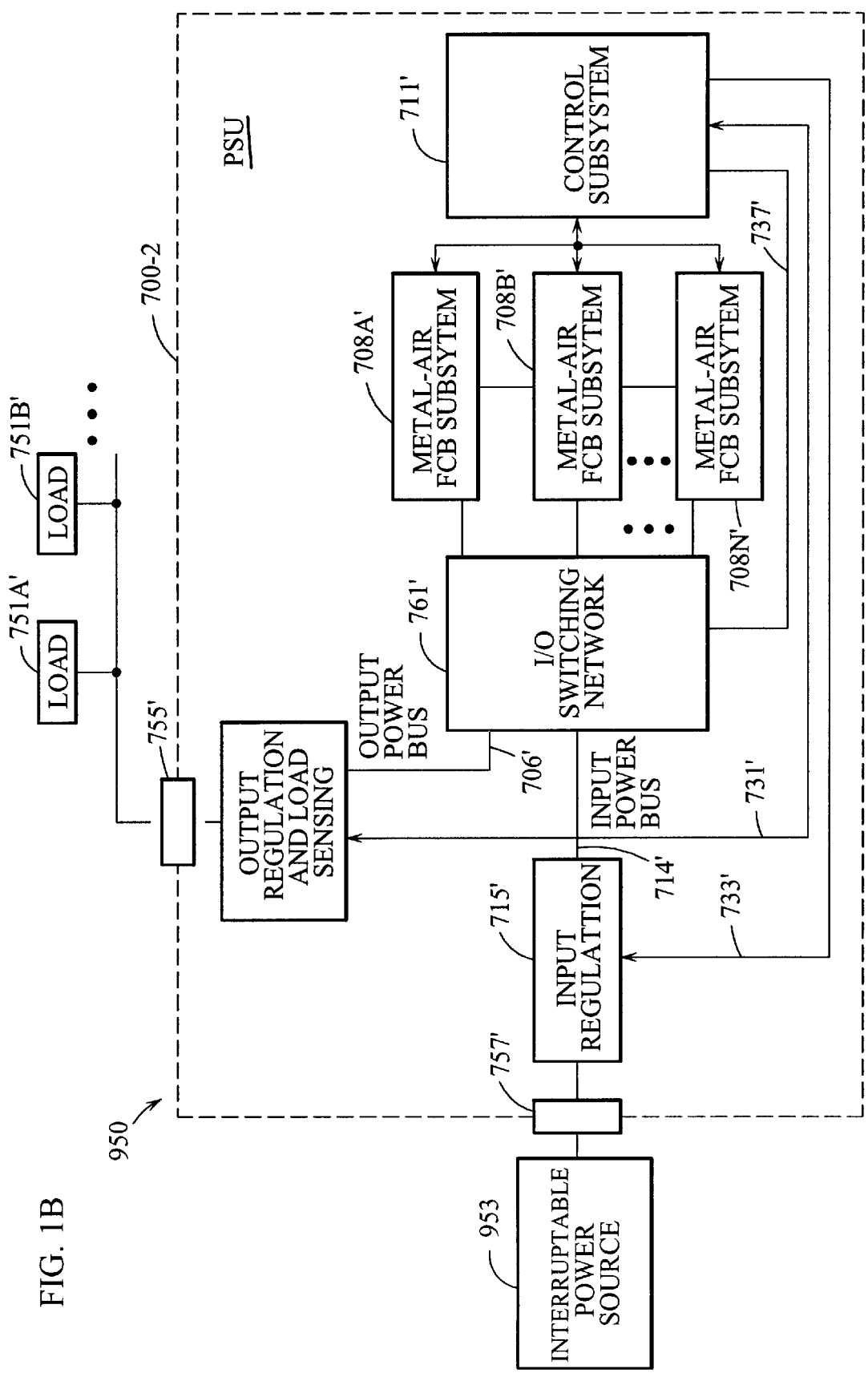
FIG. 1B is a schematic representation of a generalized embodiment of a power generation and distribution system using a refuelable and rechargeable metal-air FCB based power supply unit, wherein a network of metal-air FCB subsystems are operably connected to a power bus structure and controlled by a control subsystem.

In another aspect of the present invention, an interruptible power generation system can be transformed to become an uninterruptible power generation system. FIG. 1B illustrates the architecture of a generalized embodiment of an exemplary uninterruptible power generation system according to the present invention. As shown, the system 950 includes an interruptible power source 953 coupled a power supply unit 700-2. The power supply unit 700-2 is electrically coupled to the one or more electrical power-consuming load devices 751' via an output port 755', and includes at least one rechargeable and refuelable metal-air FCB subsystem 708'. Each metal-air FCB subsystem 708' comprises at least one metal-air fuel cell that operates in a discharging mode to provide electrical power to the output power bus 706' for supply to the one or more electrical power-consuming load devices 751' via output port 755', and operates in a recharging mode to apply electrical power (received from the interruptible electrical-power sources 753' via input port 757' and input power bus 714') across the cathode structure and consumed anode material of the metal-air fuel cell, thereby reversing the electro-chemical reaction which occurred during discharging mode of operation. In addition, the power supply unit 700-2 preferably includes elements similar to the elements of the power supply unit 700-1 of FIG. 1A as set forth above.

It should be noted, that in the preferred embodiment of the present invention, the one or more electrical power-consuming load devices 751' coupled to the uninterruptible power generation system 950 via output port 755 are supplied power solely via the discharging operation of the metal-air FCB based power supply unit 700-2, and that the interruptible power source 953 is used solely as a power source in recharging the metal-air FCB based power supply unit 700-2.

Advantageously, the power generation system of FIG. 1B (and the rechargeable and refuelable metal-air FCB based power supply unit integrated therein) provides improved efficiency and flexibility over prior art power generation systems. More specifically, in the event that a prolonged interruption occurs in the power delivered by an interruptible power source, the power generation system can be used without prolonged interruption by refueling the metal-air FCB based power supply unit integrated therein, if need be. Hereto, the environmental and safety hazards, costs, unfriendly noises and other limitations associated with the prior art forms of auxiliary power generation (based upon conventional battery technology and combustible fuel) are avoided.

In yet another aspect of the present invention, the metal-air FCB subsystems 708 as described above preferably have a modular architecture to enable flexible and user-friendly operations in loading of metal-fuel, unloading of consumed metal-fuel, replacement of the ionic-conducting medium, and replacement of the cathode. More specifically, the metal-air FCB subsystem 708 preferably includes at least one first-module that houses the metal-fuel anode material and the consumed anode material for one or more of the cathode structures of the metal-air FCB subsystem 708. The first-module is manually insertable into a first recess in the housing of the metal-air FCB subsystem 708 (and in the device/system in which the metal-air FCB subsystem is integrated), wherein it is used in discharge operations and/or recharge operations. In addition, one or more cathode structures of the metal-air FCB subsystem 708 are preferably disposed in at least one second-module that is manually insertable into a second recess in the housing of the metal-air FCB subsystem 708 (and in the device/system in which the metal-air FCB subsystem is integrated), wherein the cathode element(s) disposed therein is used in discharge operations and/or recharge operations.

During discharge operations, the metal-fuel anode material housed in the first module is brought into "ionic-contact" with a cathode structure, by way of the ionically-conducting medium. When the cathode and anode material are brought into ionic contact, a characteristic open-cell voltage is automatically generated. The value of this open-cell voltage is based on the difference in electrochemical potential of the anode and cathode materials. When an electrical power-consuming load is connected across the cathode and anode structures of the metal-air FCB cell, so constructed, the metal-air FCB subsystem 708 delivers electrical power to the electrical power-consuming load, as oxygen $O_2$ from the ambient environment is consumed and metal-fuel anode material oxidizes.

During recharge operations, consumed anode material (e.g., oxidized metal-fuel material) housed in the first-module is brought into "ionic-contact" with a cathode structure, by way of the ionically-conducting, and power is applied thereto. Therewhile, electrical current flowing between the cathode and anode structures reverses the electro-chemical reaction which occurred during discharging operations.

During refueling operations, the first-module (that houses consumed anode material, e.g., oxidized metal) is manually removed, a first-module housing "fresh" anode material is loaded into the first recess, to thereby enable loading of metal-fuel. In this refueling operation, the corresponding cathode structure(s) (which is/are preferably disposed in the second-module when manually inserting the second-module into the second recess as set forth above) need not be replaced.

During cathode replacement operations, one or more cathode structures of the metal-air FCB system 708 are manually removed and replaced with fresh cathode structure(s). Preferably, the cathode structures are disposed in the second-module, and replaced by manually loading the second-module (wherein one or more fresh cathode structures are disposed) into the second-recess of the system. The refueling operations described above (which loads a first-module housing fresh metal-fuel and, possibly, fresh ionically-conducting medium into the first recess in the main housing of the metal-FCB system) may be performed in conjunction with such cathode replacement operations.

The ionic-conducting medium may be integrated to the metal-fuel anode material and disposed in the first-module when loaded into the first recess of the housing of the system. In such systems, the refueling operations set forth above replace the first-module to thereby load both fresh anode material and fresh ionically-conducting medium into the first-recess in the housing of the system.

Alternatively, the ionic-conducting medium may be integrated to the cathode structure(s) of the metal-air FCB cells and disposed in the second-module when loaded into the second recess of the housing of the system. In such systems, the cathode replacement operations set forth above replace the second-module to thereby load both fresh cathode structure(s) and fresh ionically-conducting medium into the second-recess in the housing of the system.

In another embodiment, the ionic-conducting medium may not be integrated to the anode material and the cathode structure(s) of the metal-air FCB cells. In such systems, ionically-conducting medium replacement operations are performed to replace ionically-conducting medium for one or more of the metal-air FCB cells with fresh ionically-conducting medium. It should be noted such replacement operations may be performed in conjunction with the refueling operations and cathode replacement operations set forth above.

Advantageously, such a modular architecture enables flexible and user-friendly operations in loading of metal-fuel, unloading of consumed metal-fuel, replacement of the ionic-conducting medium, and replacement of the cathode structures in metal-air FCB systems.

Figure 1C:
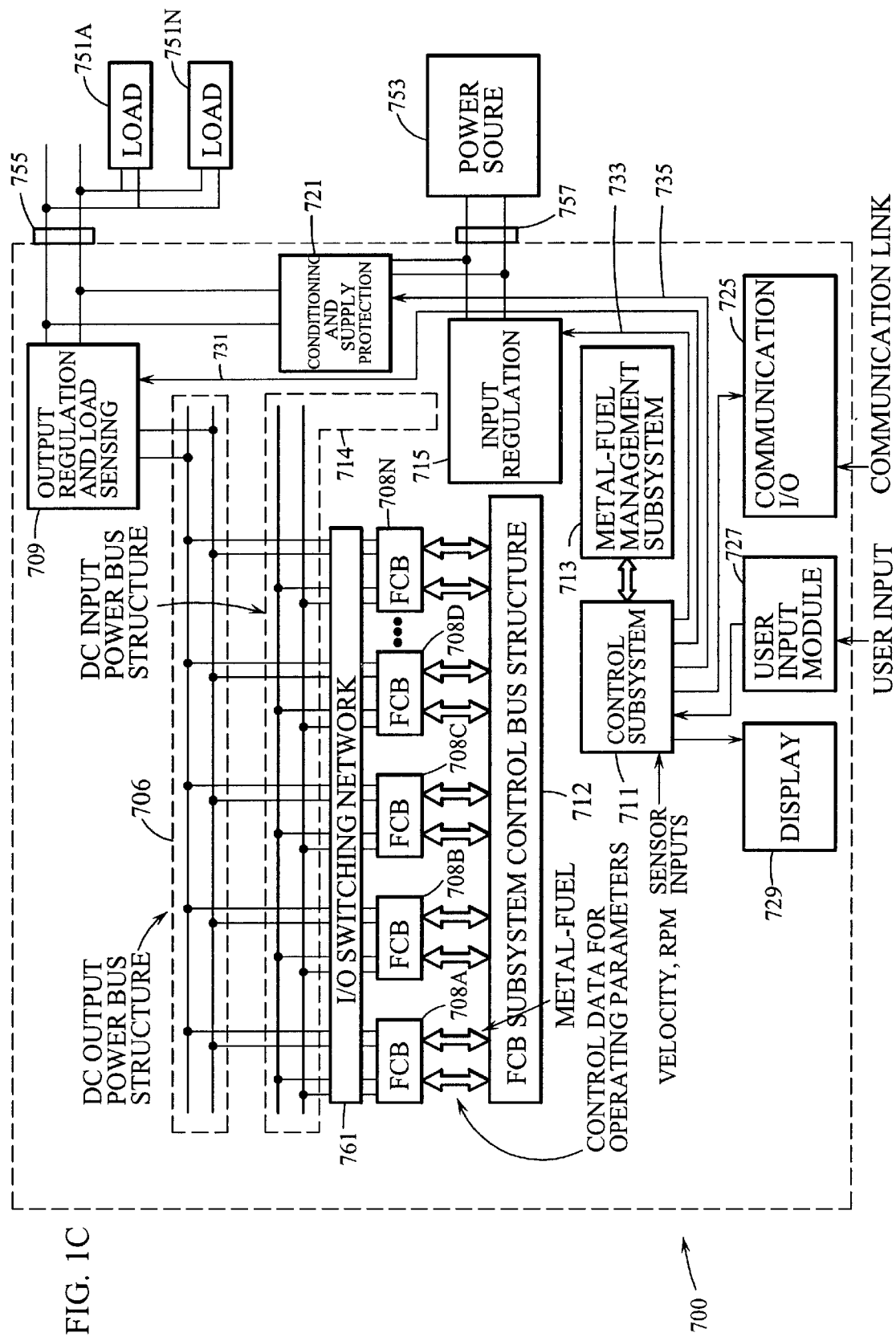
FIG. 1C is a schematic representation of a generalized embodiment of the refuelable and rechargable metal-air FCB based power supply unit of the present invention, wherein a network of metal-air FCB subsystems are operably connected to a power bus structure and controlled by a control subsystem in operable association with a metal-fuel management subsystem.
Figure 2:
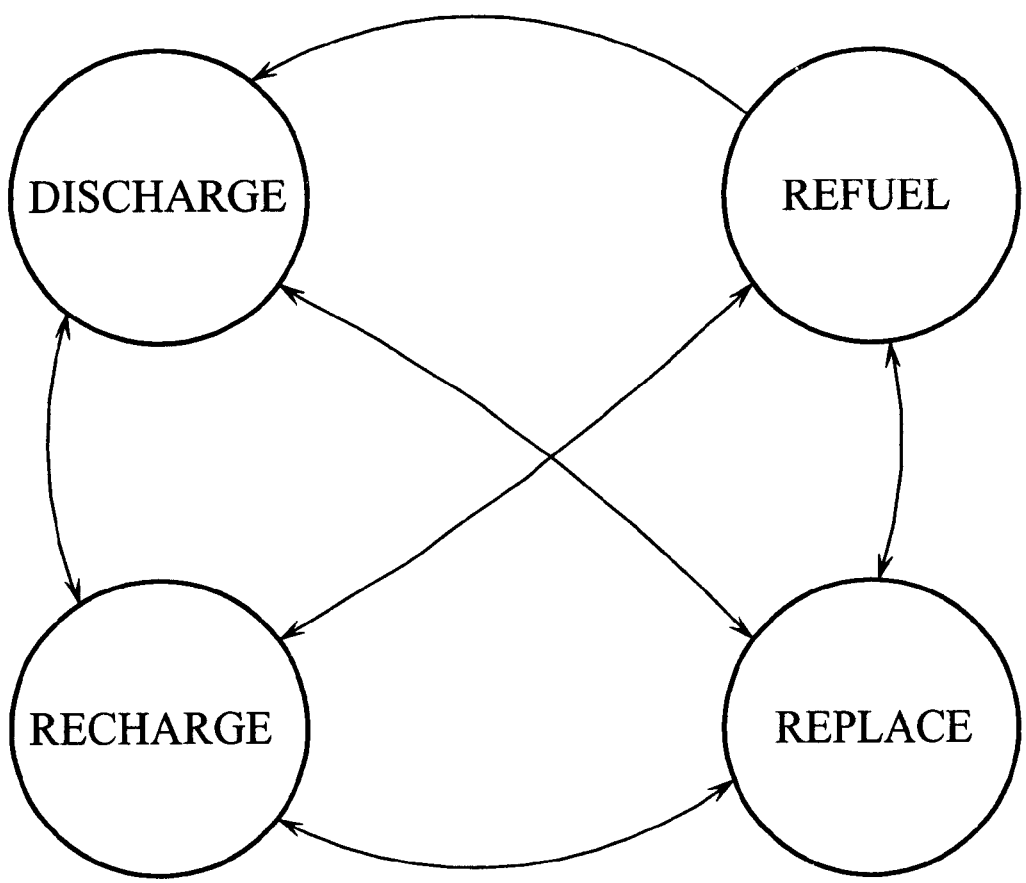
FIG. 2 is a schematic representation of the modes of operation of the refuelable and rechargable metal-air FCB based power supply unit of FIGS. 1A–1C as controlled by the control subsystem.

FIG. 1C illustrates the architecture of a generalized embodiment of the power supply unit 700 of the present invention. FIG. 2 depicts the modes of operation of this exemplary power supply unit 700, which preferably include a discharging mode, recharging mode, refuel mode, and replace mode as shown. The power supply unit 700 transitions between these modes based upon predetermined conditions (such as detection of a user-input event, sensing that one or more electrical power-consuming loads coupled to the system require electrical power, or sensing that elements of the system require refueling, recharging, or replacement (e.g., because the available power from one or more cells drops below a predetermined threshold power level, or because the elements have been used for a predetermined operational lifetime). A more detailed description of the elements of the system and the operation of the system in each of these modes follows below.

As shown in FIG. 1C, the exemplary power supply unit 700 comprises at least one metal-air FCB subsystem 708 (depicted in FIG. 1C as subsystems 708A, 708B, 708C, 708D . . . 708N) that operates in a discharging mode to provide DC electric power to the output power bus 706, thereby supplying DC electrical power to an output regulation and load sensing circuitry 709. In the discharging mode, the output regulation and load sensing circuitry 709 regulates the electric DC power supplied on the output power bus structure 706 to control the output voltage levels (and, preferably the output current levels) supplied to the electrical power-consuming load(s) (two electrical power-consuming loads shown as 751A and 751B) coupled thereto via output port 755, such that the power output from port 755 is in a form suitable for consumption by the electrical power-consuming load(s) 751. The output regulation and load sensing circuitry 709 may convert the DC electric power provided thereto to AC electrical power for output to the electrical power-consuming load(s) 751 in the event that the electrical power-consuming loads require such AC electrical power.

As shown in FIG. 1C, the output regulation and load sensing circuitry 709 preferably includes circuitry for sensing real-time conditions (voltage levels or current levels) of the supply of power to the electrical power-consuming load(s) 751 and generating control signals indicative of such conditions. Such power regulation and sense circuitry may be realized using solid state circuitry well known the power generation and control arts.

As shown in FIG. 1C, the power supply unit 700 includes input regulation circuitry 715, coupled to one or more electric power sources 753 via input port 757, that operates in recharge mode to regulate the input voltage levels (and, preferably the input current levels) supplied thereto from the power source 753 such that it has DC signal characteristics suitable for use by the metal-air FCB subsystem(s) 708 in the recharge mode. The DC power signals generated by input regulation circuitry 715 in the recharge mode are delivered to the metal-air FCB system(s) 708 over the input power bus 714. The input regulation circuitry 715 may convert the AC electric power provided thereto to DC electrical power for supply to the metal-air FCB subsystem(s) in the event that the power source(s) supply AC electrical power. Such power regulation circuitry may be realized using solid state circuitry well known the power generation and control arts.

As shown in FIG. 1C, the power supply unit 700 preferably includes conditioning and surge protection circuitry 721 coupled to both the input port 757 and output port 755 to provide signal filtering (for noise reduction) and surge protection functionality with respect to the electrical power signals passing through both the input port 757 and the output port 755. Such signal conditioning and surge protection may be realized using solid state circuitry well known the power generation and control art.

As shown in FIG. 1C, the power supply unit 700 includes a control subsystem 711 (e.g. programmed controller) for controlling the operation of the system. The control subsystem 711 preferably interfaces to a user input module 727 for providing user input to the control subsystem, and to a display device 729 for displaying information relating to the status and operation of the system. The user-input module 727 may comprise a touch pad, key pad, keyboard, pointing device, touch input device, speech input system, or any other means of providing user-input to the control subsystem 711. The display device 729 may be a matrix display, one or more light emitting diodes (LEDs), or any other means that communicates to the user information relating to the status and operation of the system. In addition, the control subsystem 711 preferably interfaces to a communication input/output module 725 that provides a communication link between the power generation system 700 and other devices.

The control subsystem 711 controls operation of the metal-air FCB subsystems within the network (e.g. by way of controlling discharging/recharging parameters during discharging/recharging modes of operation, respectively, and collecting metal-fuel and metal-oxide indicative data from the particular metal-air FCB subsystems on a real-time basis). A control bus 712 operably couples the control subsystem 711 to each metal-air FCB subsystem 708A through 708H (to enable the transfer of metal-fuel indicative data from the FCB subsystems to the control subsystem 711, and the transfer of control signals from the control subsystem 711 to the FCB subsystems during discharge mode operations).

Preferably, a metal-fuel management subsystem (e.g. a relational database management system) 713 is operably coupled to the control subsystem 711, for storing information representative of the amount of metal-fuel (and metal-oxide) present along metal-fuel zones in each FCB subsystem connected between bus structures 706 and 712 in the system. The metal-fuel management subsystem 713 may be operatively coupled to the control subsystem 711 over a communication link via the communication input/output module 725.

As shown in FIG. 1C, the control subsystem 711 is operably coupled to other elements of the system via signal paths that enable the exchange of control data therebetween. More specifically, the control subsystem 711 is operably coupled to the output regulation and load sensing circuitry 709 via signal path 731, to input regulation circuitry 715 via signal path 733, and to conditioning and surge protection circuitry via signal path 735.

In general, the control subsystem 711 selectively activates any one of the metal-air FCB subsystems 708 in the discharging mode to contribute to power supplied to the one or more electrical power-consuming load device(s) 751 via output port 755 by controlling the switching network 761 (via the signal path 737) to couple the power terminals (preferably, the output power terminals) of the selected metal-air FCB subsystems 708 to the output power bus 706. In addition, the control subsystem 711 selectively activates any one of the metal-air FCB subsystems 708 in the recharging mode to use power supplied by external power source(s) 753 via input port 757 by controlling the switching network 761 (via the signal path 737) to couple the power terminals (preferably, the input power terminals) of the selected metal-air FCB subsystems 708 to the input power bus 714. In addition, the control subsystem 711 preferably controls the switching network (via signal path 737) to selectively couple together the power terminals of two or more of the metal-air fuel cell battery subsystems 708 coupled thereto to thereby selectively carry out multiple discharge schemes (some of which combine the power output of the FCB subsystems to provide output with current levels and/or voltage levels that cannot be provided by one of the FCB subsystems alone). Details of these output power control schemes is described in detail in U.S. Patent Application No. PCT/US98/21260, herein incorporated by reference in its entirety.

FIG. 2 illustrates the preferred modes of operation of the power generation system 700 of FIGS. 1A–1C including a discharging mode, recharging mode, refuel mode, and replace mode. Preferably, the control operations performed in each mode and the transitions between modes is performed by a control routine of instructions stored in the memory of the control subsystem 711, and executed by the controller of the control subsystem 711.

In the discharging mode, the control subsystem 711 selectively activates (via control bus 712) the Metal-Fuel Discharge Subsystems of one or more of the metal-air FCB subsystems 708 to generate power and controls the switching network 761 (via the signal path 737) to couple the power terminals (preferably, the output power terminals) of the one or more activated metal-air FCB subsystems 708 to the output power bus 706. In addition, the control subsystem 711 preferably activates the output regulation and load sensing circuitry 709 (via signal path 731) to provide power on DC output power bus structure 706 to the electrical power-consuming load(s) 751, which are coupled thereto via port 755. In addition, the control subsystem 711 preferably monitors control signals generated by the load sensing circuitry 709 and supplied thereto via signal path 731 to determine that the power generated by the FCB subsystem(s) 708 and supplied to the electrical power-consuming load(s) 751 is adequate. In the event that this power is not adequate, the controller can adjust the discharging operating parameters of the FCB system (or selectively activate other FCB subsystems) to meet the required loading conditions. In the alternative, the control subsystem may transition to recharge mode and/or refuel mode if the FCB subsystems of the power supply unit 700 cannot meet the required demand.

In the recharging mode, the control subsystem 711 selectively activates (via control bus 712) the Metal-Fuel Recharge Subsystems of one or more of the metal-air FCB subsystems 708 and controls the switching network 761 (via the signal path 737) to couple the power terminals (preferably, the input power terminals) of the one or more activated metal-air FCB subsystems 708 to the input power bus 714. In addition, the control subsystem 711 preferably activates the input regulation circuitry 715 (via signal path 733) to provide power supplied thereto from power source(s) 753 via input port 757 to the input power bus 714, to thereby recharge the selected metal-air FCB subsystems.

Moreover, in the event that that the system is not operating in discharge mode (i.e., none of the metal-air FCB subsystems are supplying power to the output bus 705), the control system 711 may control the output regulation circuitry 709 (via signal path 731) to isolate the output power bus 706 from the output port 755. Similarly, in the event that that the system is not operating in recharge mode (i.e., none of the metal-air FCB subsystems are actively coupled to the input bus 714), the control system 711 may control the input regulation circuitry 715 (via signal path 733) to isolate the input power bus 714 from the input port 757.

During the refuel mode, the control subsystem 711 identifies one or more first-modules disposed within the metal-air FCB subsystems 708 that require replacement (preferably by monitoring the information stored in the metal-fuel management subsystem 713 that is representative of the amount of metal-fuel and metal-oxide disposed within the first-modules) and communicates with the user, preferably via display 729, to provide an indication that the identified first-modules require replacement. For each identified first-module requiring replacement, the user manually removes the first-module and loads a first-module housing "fresh" (i.e., (re)charged) anode material into the first recess in the housing. After the replacement is complete (which may be detected manually by user input, or automatically by sensing the amount of metal-oxide disposed in the first-module inserted into the given first-recess), the control subsystem 711 preferably updates the information stored in the metal-fuel management subsystem 713 representative of the amount of metal-fuel disposed within the first-modules. As set forth above, in the preferred embodiment of the present invention, the first-module houses anode material integral with ionically-conducting medium. In such systems, such refuel mode operation replaces the first-module to enable loading of both metal-fuel and "fresh" ionically-conducting medium. In addition, in the refueling mode, the control subsystem 711 may perform replace mode operations module as described below with respect to cathode structures corresponding to the replaced first-module.

In the replace mode, the control subsystem 711 identifies one or more cathode structures that require replacement (preferably by monitoring the information stored in the management subsystem 713 that is representative of the operational lifetime of the particular cathode structure) and communicates with the user, preferably via display 729, to provide an indication that the identified cathode structure(s) require replacement. For each identified cathode structure requiring replacement, the user manually replaces the cathode structure. In the preferred embodiment of the present invention, wherein the cathode structure is disposed in a second-module that is manually loadable/unloadable from a second-recess in the housing of the system, the user manually removes the second-module from the second-recess and loads a second-module housing a "fresh" cathode structure into the second-recess. After the replacement is complete (which may be detected manually by user input), the control subsystem 711 preferably updates the information stored in the management subsystem 713 representative of the operational lifetime of the fresh cathode structure.

The ionic-conducting medium may be integral to the metal-fuel anode material and disposed in the first-module when loaded into the first recess of the housing of the system. In such systems, the refueling mode operations set forth above replace the first-module to thereby load both fresh anode material and fresh ionically-conducting medium into the first-recess in the housing of the system.

Alternatively, the ionic-conducting medium may be integral to the cathode structure(s) of the metal-air FCB cells and disposed in the second-module when loaded into the second recess of the housing of the system. In such systems, the cathode replacement operations of the replace mode set forth above replace the second-module to thereby load both fresh cathode structure(s) and fresh ionically-conducting medium into the second-recess in the housing of the system.

In another embodiment, the ionic-conducting medium may not be integral to the anode material and the cathode structure(s) of the metal-air FCB cells. In such systems, the cathode replacement operations set forth above replace the second-module to thereby load both fresh cathode structure(s) and fresh ionically-conducting medium into the second-recess in the main housing of the FCB subsystem.

In yet another embodiment of the invention, the ionically-conducting medium may not be integral to the anode material and the cathode structure(s) of the FCB cells. In such systems, in the replace mode, the control subsystem 711 determines that the ionically-conducting medium for one of the FCB subsystems require replacement (preferably by monitoring the information stored in the management subsystem 713 that is representative of the operational lifetime of the particular ionically-conducting medium) and communicates with the user, preferably via display 729, to provide an indication that the identified ionically-conducting medium requires replacement. For each identified ionically-conducting medium requiring replacement, the user manually replaces the ionically-conducting medium. After the replacement is complete (which may be detected manually by user input), the control subsystem 711 preferably updates the information stored in the management subsystem 713 representative of the operational lifetime of the fresh ionically-conducting medium.

It should be understood that the control system 711 may perform the operations for the various modes (discharge, recharge, refuel, replace) described above in parallel with respect to multiple FCB subsystems/modules/cells that can be independently managed. For example, the control subsystem 711 can selectively activate (via control bus 712) the discharge of a first set of the metal-air FCB subsystems 708 and control the switching network 761 (via the signal path 737) to couple the power terminals (preferably, the output power terminals) of these first set of activated metal-air FCB subsystems 708 to the output power bus 706. Concurrently therewith, the control subsystem 711 can selectively activate (via control bus 712) the recharge of a second set of the metal-air FCB subsystems 708 (disjoint from the first set of metal-air FCB systems) and control the switching network 761 (via the signal path 737) to couple the power terminals (preferably, the input power terminals) of these second set of activated metal-air FCB subsystems 708 to the input power bus 714.

Specific means for optimally carrying out such discharging, recharging, refueling, ionically-conducting medium replacement, and cathode replacement processes in metal-air FCB systems and devices will be described in detail below in connection with the various illustrative embodiments of the present invention.

Figure 3:
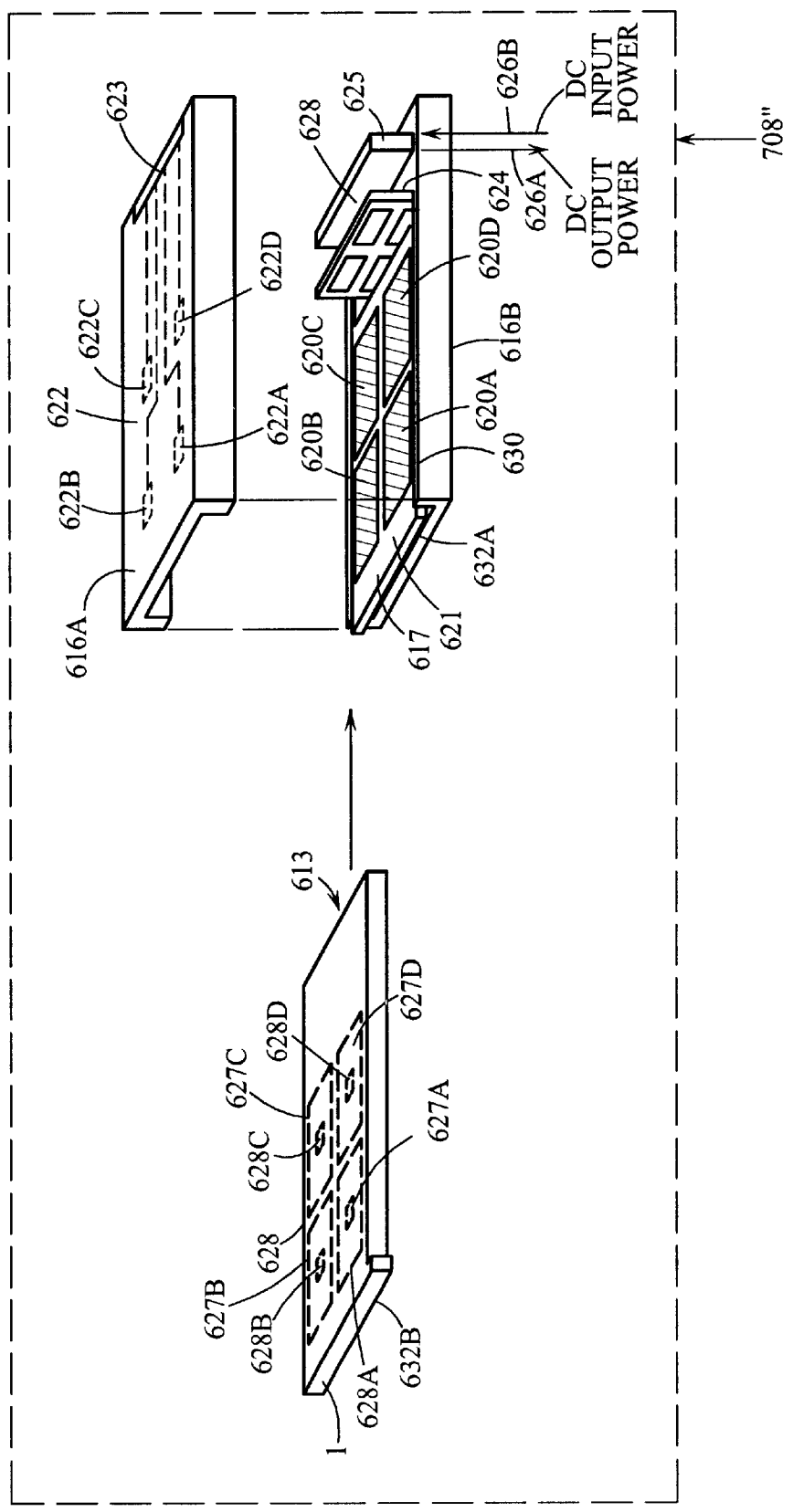
FIG. 3 is an exploded perspective view of the first illustrative embodiment of a metal-air FCB based power supply unit of FIGS. 1A–1C according to the present invention, wherein the upper housing portion is detached from the lower housing portion to reveal that the four-element cathode structure (i.e., submodule) is releasably inserted into a recess formed in the lower housing portion, and wherein a four-element metal fuel card is slidably inserted into a second recess between the upper housing portion and the four-element cathode structure.

The First Illustrative Embodiment of the Metal-Air FCB System of the Present Invention The first illustrative embodiment of the metal-air FCB subsystem hereof is illustrated in FIG. 3. As shown, this FCB subsystem 708" comprises an upper housing portion 616A (releasably) detachable from a lower housing portion 616B. When attached these two housing portions 616A and 616B form the main housing of this FCB system. A four-element cathode structure 617 is manually loadable/unloadable within a recess formed in the lower housing portion 616B. An air-pervious panel 619 is formed in the bottom side surface of the lower housing portion 616B for allowing ambient air to flow through the cathode elements 620A through 620D provided in cathode structure 621. A four-element anode contacting structure 622 is preferably integrally-formed in the upper housing portion, including a plurality of spring-biased electrical contacts 622A through 622D which are electrically connected to and terminated in a second electrical connector 623 by way of a plurality of electrical connectors.

The cathode structure 617 comprises a support frame 621 with a plurality of recesses 630 each having a perforated bottom support surface to enable passive air diffusion. The cathode elements 620A through 620D terminate in a first electrical connector 618 (not shown).

A metal-fuel card 613, which is manually loadable/unloadable within the recess in the housing formed between the cathode structure 621 and the four-element anode contacting structure 622 (i.e., when the upper housing portion 616A is attached to the lower housing portion 616B), carries a plurality of metal fuel elements 627A through 627D upon a support structure 628 having apertures 628A through 628D which allow the plurality of spring-biased electrical contacts 622A through 622D to engage a respective metal-fuel element 627A through 627D when the metal-fuel card is slid within its recess as shown.

When metal-fuel card 613 and the cathode structure 617 are slid into there respective recesses, an ionically-conducting medium is disposed at least between the cathode elements 620A through 620D and the corresponding metal-fuel elements 627A through 627B, the ionically-conducting medium may be integrated with the metal-fuel elements 627A through 627B (or integrated with the cathode elements 620A through 620D) by affixing a solid-state ionically-conducting medium (such as an ionic-conducting polymer) to these metal-fuel elements. Alternatively, the metal-fuel card 613 (or the cathode structure 617) may have pads impregnated with an electrolyte (or ionic-conducting gel made from am ionically-conducting polymer) disposed thereon which act as the ionically-conducting medium. Other solutions include disposing an electrolytic solution between such structures. Preferably, the outer edge portions 632A (and 632B) of the cathode structure 617 and the metal-fuel card 613 are each adapted to form a vapor tight seal with the module housing when the cathode structure 617 and card 613 are loaded within the module housing. This will prevent the electrolyte from evaporating prior to discharging operations.

One or more printed circuit (PC) boards (two shown as 624 and 625), which may be mounted within the lower housing portion, provides electrical connectors for establishing electrical contact with the first and second electrical connectors 618 and 623 associated with the cathode structure 617 and the anode contacting structure 622, respectively, and carry electronic circuitry for discharging power to an output port 626A (and possibly recharging from power delivered to input port 626B) with respect to the four metal-air fuel cells disposed between the cathode structure 617 and the anode contacting structure 622. This electronic circuitry may include circuitry necessary for realizing output terminal reconfiguration and output power control, which is described in detail in U.S. Patent Application No. PCT/US98/21260, herein incorporated by reference in its entirety.

Figure 4:
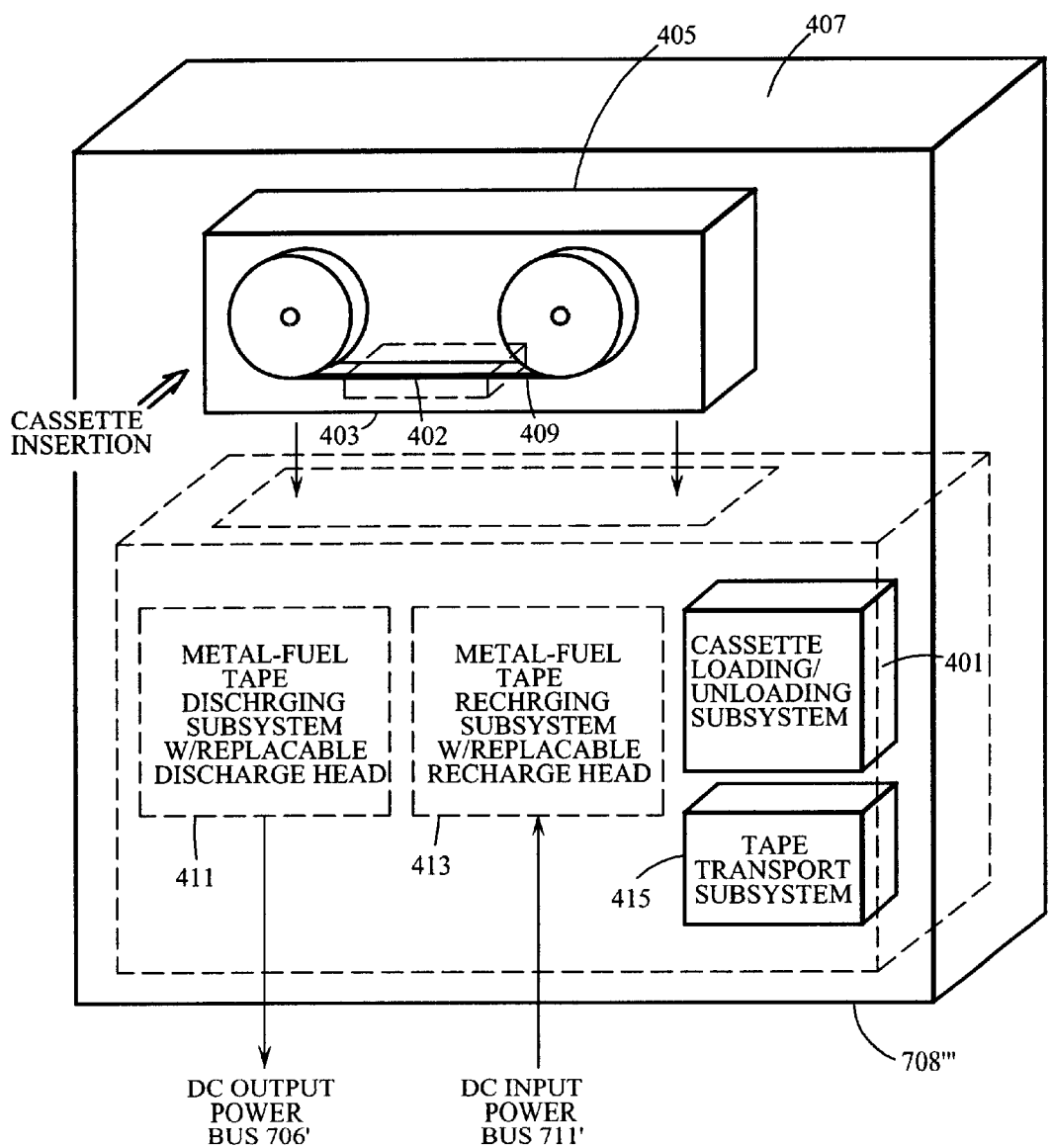
FIG. 4 is a schematic block diagram of a second illustrative embodiment of a metal-air FCB based power supply unit of FIGS. 1A–1C according to the present invention, wherein metal-fuel tape housed in a cassette-type module is manually inserted into a port in the subsystem for transport to a Metal-Fuel Tape Discharging Subsystem and a Metal-Fuel Recharging Subsystem.
Figure 5:
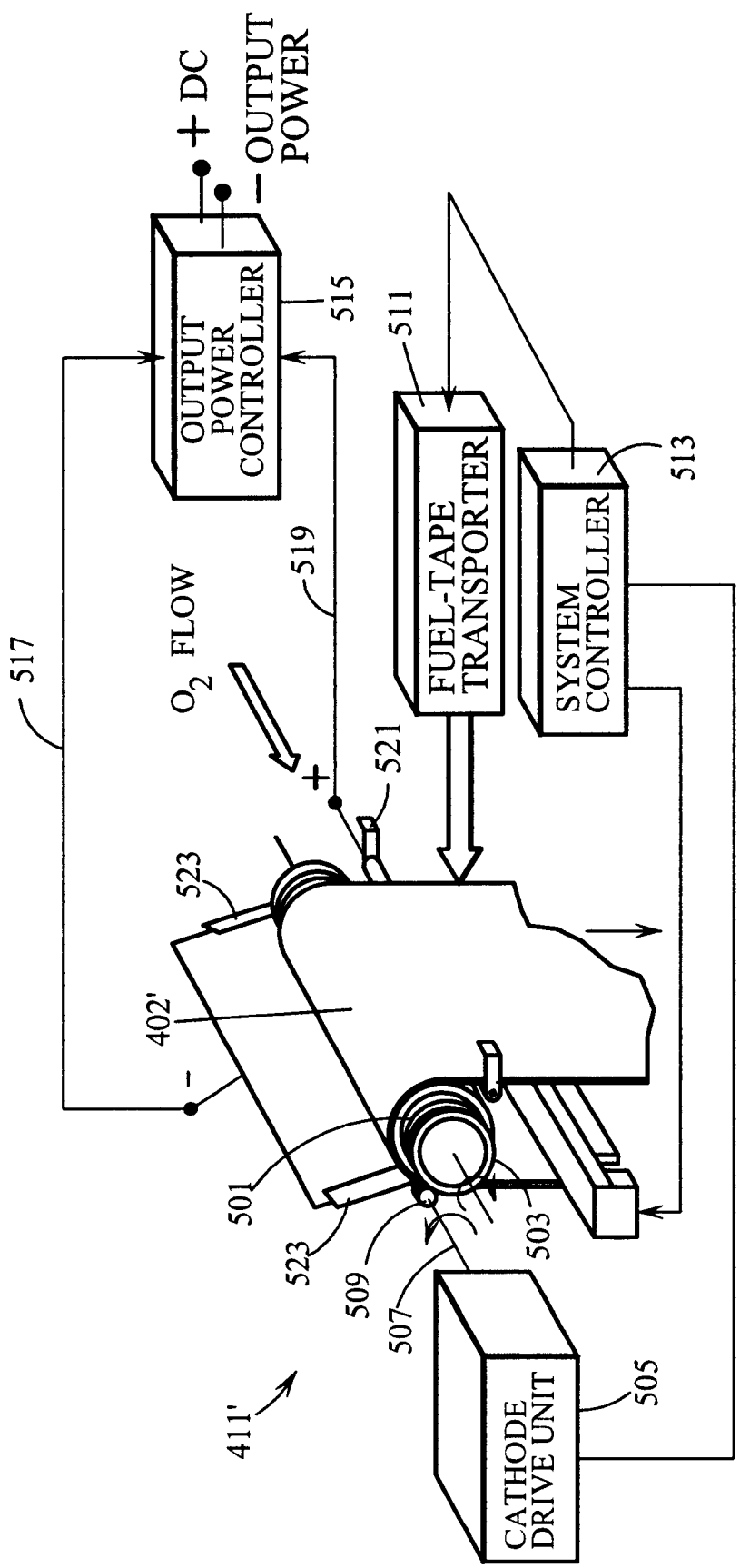
FIG. 5 is a schematic representation of an exemplary Fuel-Tape Discharging Subsystem of the second illustrative embodiment of FIG. 4 according to the present invention, wherein metal-fuel tape is passed over a rotating cylindrical cathode structure.

The Second Illustrative Embodiment of the Metal-Air FCB System of the Present Invention The second illustrative embodiment of the metal-air FCB system hereof is illustrated in FIGS. 4 and 5. As shown in FIG. 4, this metal-air FCB system 708''' comprises a number of subsystems, namely a Metal-Fuel Tape Cassette Cartridge Loading/Unloading Subsystem 401 for loading the metal-fuel tape cassette cartridge 403 to and from the system 708'''. It comprises a number of cooperating mechanisms, namely: a cassette receiving mechanism for receiving the cassette cartridge 403 at a cassette insertion port 405 formed in system housing 407 by a user inserting the cassette cartridge 403 into the port 405, and automatically withdrawing the cartridge into the cassette storage bay therewithin; an automatic door opening mechanism for opening a door 409 formed in the cassette cartridge 403 (for metal-fuel tape access) when the cartridge 403 is received within the cassette storage bay of the FCB system; and an automatic cassette ejection mechanism for returning the cassette cartridge 403 from the cassette storage bay through the cassette insertion port 405 in response to a predetermined condition (e.g., the depression of an "eject" button provided on the front panel of the system housing, automatic sensing of the end of the metal-fuel tape, etc.), where it is manually removed from port 405 by the user.

In the illustrative embodiment of FIG. 4, the cassette receiving mechanism can be realized as a platform-like carriage structure that surrounds the exterior of the cassette cartridge housing. The platform-like carriage structure can be supported on a pair of parallel rails, by way of rollers, and translatable therealong by way of an electric motor and cam mechanism. These devices are operably connected to the system controller which will be described in greater detail hereinafter. The function of the cam mechanism is to convert rotational movement of the motor shaft into a rectilinear motion necessary for translating the platform-like carriage structure along the rails when a cassette is inserted within the platform-like carriage structure. A proximity sensor, mounted within the system housing, can be used to detect the presence of the cassette cartridge being inserted through the insertion port and placed within the platform-like carriage structure. The signal produced from the proximity sensor can be provided to the system controller in order to initiate the cassette cartridge withdrawal process in an automated manner.

Within the system housing, the automatic door opening mechanism can be realized by any suitable mechanism that can slide the cassette door 409 into its open position when the cassette cartridge is completely withdrawn into the cassette storage bay. In the illustrative embodiment, the automatic cassette ejection mechanism employs the same basic structures and functionalities of the cassette receiving mechanism described above. The primary difference is the automatic cassette ejection mechanism responds to the depression of an "ejection" button provided on the front panel of the system housing 407, or functionally equivalent triggering condition or event. When the button is depressed, the control subsystem 711' system causes the Metal-Fuel Tape Discharging Subsystem 411 (or the Metal-Fuel Tape Recharging Subsystem 413) to withdraw its discharge heads (or recharge heads), and controls the Tape Transport Subsystem 415 to transport the metal-fuel tape 402 back to the cassette cartridge 403; and the cassette cartridge automatically returns from the cassette storage bay, through the cassette insertion port 405.

The Metal-Fuel Tape Discharging Subsystem 411 generates electrical power from the metal-fuel tape 402 during the discharge mode of operation, and supplies that power to a DC output power bus 706'. The Metal-Fuel Tape Recharging Subsystem 413 electro-chemically recharging (i.e. reducing) sections of oxidized metal-fuel tape 402 during the recharge mode of operation using electrical power provided on the DC input power bus 711'.

The Metal-Fuel Tape Discharging Subsystem 411 preferably uses an assembly of discharging heads (cathode structures) for discharging metal-fuel tape in the presence of air ($O_2$) and an ionically-conducting medium and generating electrical power across an electrical power-consuming load connected to the FCB system. The Metal-Fuel Tape Recharging Subsystem 413 preferably uses an assembly of recharging heads (cathode structures) for recharging metal-fuel tape in the presence of air ($O_2$) and an ionically-conducting medium and electrical power. While it may be desirable in some applications to avoid or suspend tape recharging operations while carrying out tape discharging operations, the FCB system of the first illustrative embodiment enables concurrent operation of the discharging and discharging modes. Notably, this feature of the present invention enables simultaneous discharging and recharging of metal-fuel tape during power generating operation.

The ionically-conducting medium may be integral to the metal-fuel anode tape 402 stored in the cassette cartridge 403 when inserted into the port 405 by the user and when loaded into the Metal-Fuel Tape Discharging Subsystem 411 (and the Metal-Fuel Tape Recharging System 413) during discharging operations (and recharging operations). This may be realized by affixing a solid-state ionically-conducting film (such as an ionically-conducting polymer) to the surface of the metal-fuel anode tape 402 so that is disposed between the cathode structure and the metal-fuel anode tape during discharging and recharging operations. In an alternate embodiments, the solid-state ionically-conducting medium can be formed on the cathode structures, or be realized as a separate tape structure, or be realized as an ionically-conducting liquid or gel that is disposed between the cathode structures and the metal-fuel anode tape.

The Metal-Fuel Tape Discharging Subsystem 411 (and the Metal-Fuel Tape Recharging System 413) may utilize cathode structures that are stationary relative to the moving tape 402 during the discharging (and recharging operations). A more detailed description of such structures is described in U.S. Patent Application No. PCT/US98/21256, herein incorporated by reference in its entirety. It should also be noted that the Metal-Fuel Tape Discharging Subsystem 411 may include circuitry necessary for realizing output power control of the power generated by the multiple discharging head assembly (which selectively controls the power provided to the DC output power bus), the details of which is described in U.S. patent application Ser. No. PCT/US98/21260, herein incorporated by reference in its entirety.

Alternatively, the Metal-Fuel Tape Discharging Subsystem 411 (and the Metal-Fuel Tape Recharging System 413) may utilize cathode structures that move relative to the moving tape 402 during the discharging (and recharging operations). An example of such a system is illustrated in FIG. 5 wherein the cathode structure 501 is realized as a cylindrical cathode structure 503 having a hollow center with perforations in the surface thereof to permit oxygen transport to the interface formed between an ionically-conducting medium and the metal fuel tape 402' transported thereover.

As shown in FIG. 5, the cylindrical cathode structure 501 comprises a cathode element, preferably made from nickel mesh fabric embedded within carbon and catalytic material, mounted over the outer surface of the cylindrical perforated hollow cylinder 503. The cathode cylinder 501 is rotated about its axis of rotation by a cathode drive unit 505. As shown the cathode drive unit 505 has a drive shaft 507 with a gear 509 that engages teeth formed on the edge of the cylindrical cathode 501.

The metal-fuel tape 402 is transported over the surface of the cylindrical cathode 501. An electrically-conductive "cathode-contacting" element 523 is arranged in electrical-contact with the nickel mesh fabric of the cylindrical cathode 501 and is electrically connected to conductor 517 (e.g. wiring) which terminates at output power controller 515. In addition, an electrically-conductive anode-contacting element 521 is arranged closely adjacent to the cylindrical cathode 501 and in electrical contact with the underside of the metal-fuel tape 402'. The anode-contacting element 521 is electrically-connected to conductor 519 which terminates at the output power controller 515. The output power-controller 515 provides power to the DC output power bus 706' in the discharge mode of operation.

During the discharge mode of operation, oxygen-rich air is permitted to flow through the hollow bore of the cylindrical cathode 501 and reach the interface between the ionically-conducting medium and the metal-fuel tape 402. The metal-fuel tape 402 is transported over the surface of the cylindrical cathode 501 by a fuel-tape transporter 511. The cathode drive unit 505 and the fuel tape transporter 511 are controlled by a system controller 513 so that the metal-fuel tape 402, the cathode structure 501 and the ionically-conducting medium disposed therebetween are transported at substantially the same velocity at the locus of points at which the ionically-conducting medium contacts the metal-fuel tape 402 and the cathode structure 501. This condition of operation substantially reduces the generation of frictional (e.g., shear) forces among the system components, which results in a reduction in: the amount of electrical power required to transport the cathode structures, metal-fuel tape and ionically-conducting medium during system operation; the shedding of metal-oxide particles from the metal-fuel tape and the embedding of such particles in the porous structure of the cathode; and the likelihood of damaging the cathode structures and metal fuel 402' of the FCB system.

The same structures (or similar structures) are used to realize the Metal-Air Fuel Recharging System. A more detailed description of the operation of such systems is described in U.S. Patent Application No. PCT/US98/21260, herein incorporated by reference in its entirety.

It should be noted that the Metal-Fuel Tape Discharging Subsystem may include multiple cylindrical cathode discharging structures as described above. In such system, the output power controller 515 may include circuitry necessary for realizing output power control of the power generated by the multiple discharging cathode assemblies (which selectively controls the power provided to the DC output power bus), the details of which is described in U.S. Patent Application No. PCT/US98/21260, herein incorporated by reference in its entirety.

It should also be noted that the discharge head assembly (or assemblies) of the Metal-Fuel Tape Discharging System may be readily replaceable via manual insertion (and removal) from a recess in the housing of the metal-air FCB subsystem.

Figure 6:
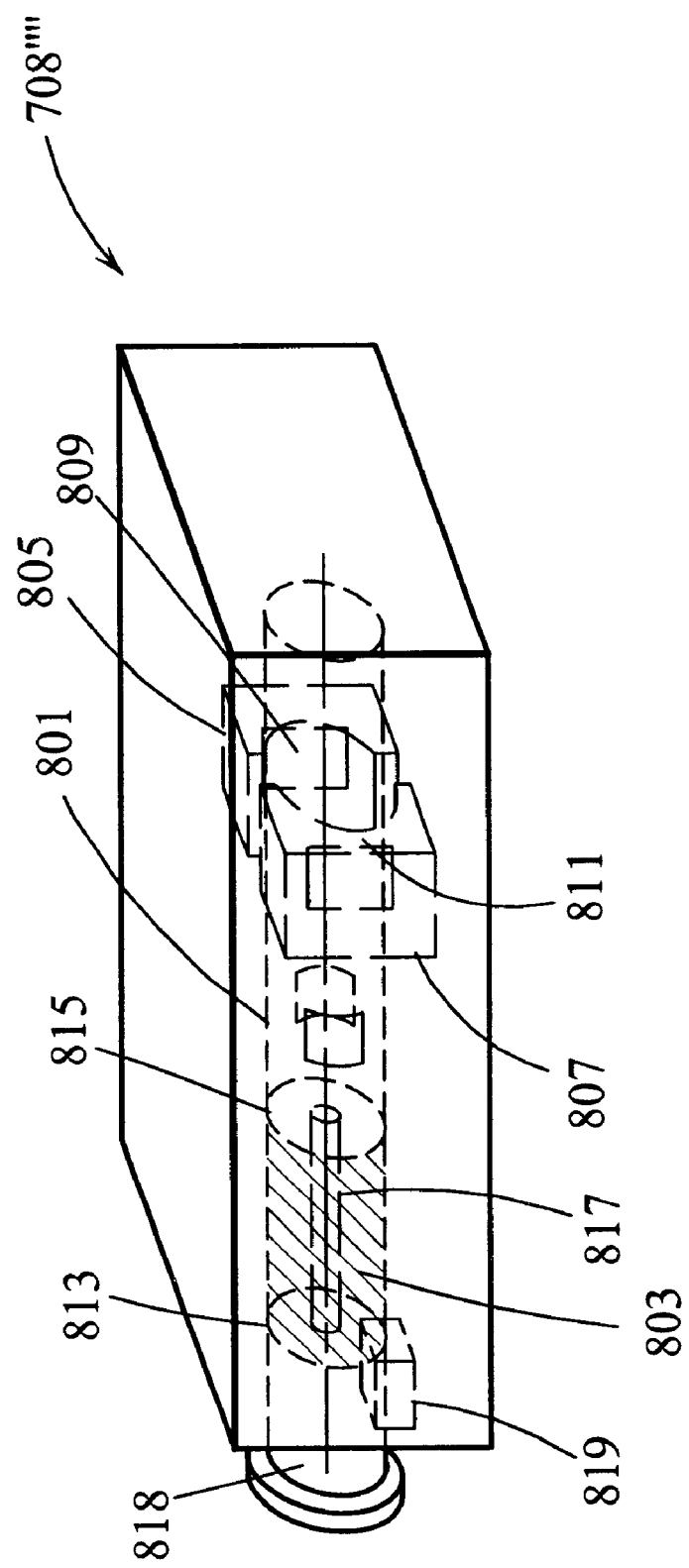
FIG. 6 is a perspective view of a third illustrative embodiment of a metal-air FCB based power supply unit of FIGS. 1A–1C according to the present invention, wherein a container holding metal-fuel paste is manually insertable into a recess in the housing of the system; the paste is transported to pass by apertures in the container that are spatially arranged with respect to the anode-contacting element and cathode structure of a discharge head assembly, to thereby expose the paste to the discharge head assembly for discharging operations; the cathode structure and anode-contacting element of the discharging head assembly is preferably releasably insertable into a second recess in the housing to provide for efficient replacement of these elements.
Figure 7:
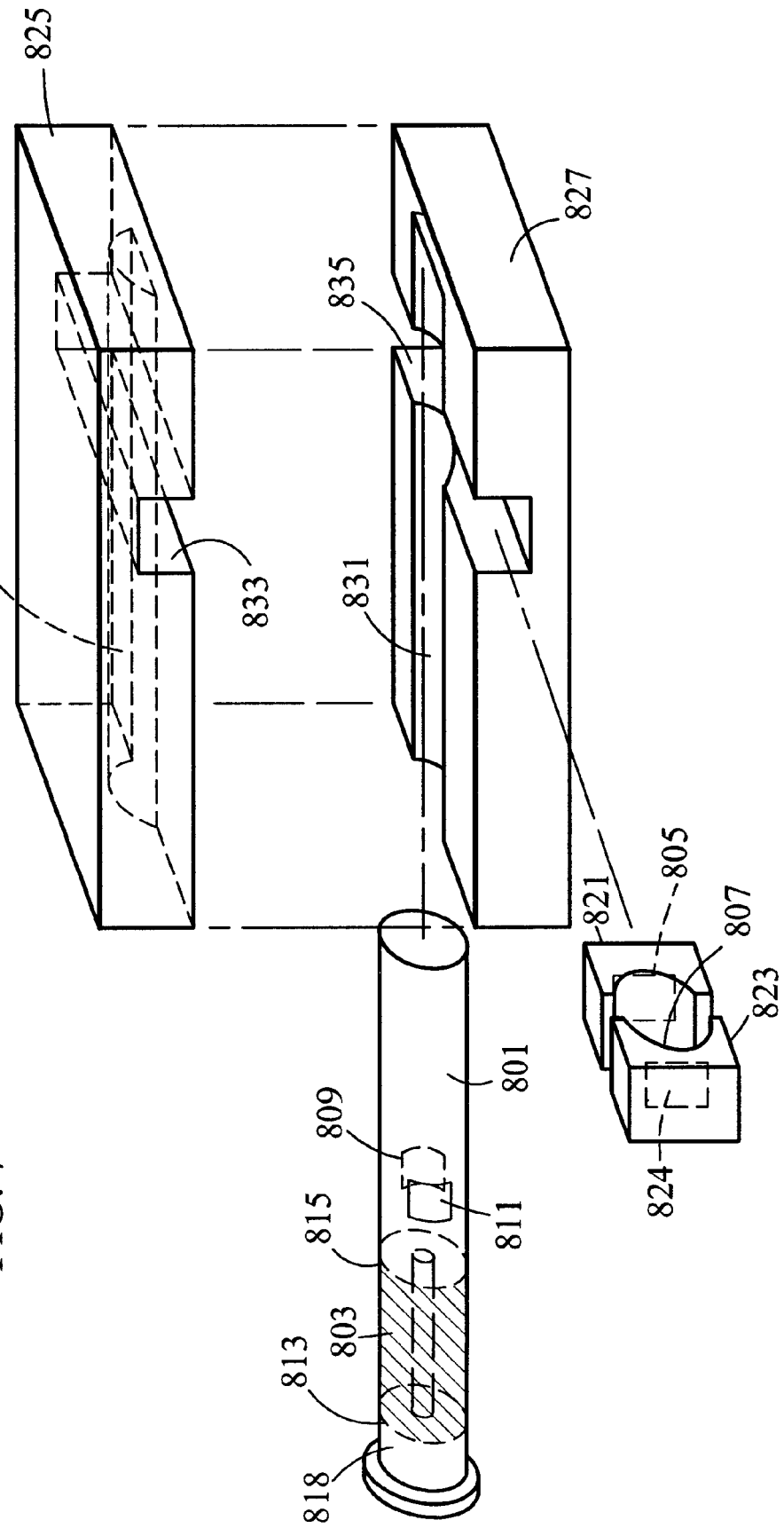
FIG. 7 is an exploded perspective view of the third illustrative embodiment of FIG. 6 according to the present invention, wherein the upper housing portion is detached from the lower housing portion to reveal that the paste container is slidably inserted into a first-recess formed in the housing, and the discharge head assembly (comprising an anode-contacting element and cathode structure) slidably inserted into a second recess formed in the housing.

The Third Illustrative Embodiment of the Metal-Air FCB System of the Present Invention The third illustrative embodiment of the metal-air FCB system hereof is illustrated in FIGS. 6 and 7. As shown in FIG. 6, this metal-air FCB system 708"" comprises a number of subsystems, namely a Metal-Fuel Paste Holder, a Metal-Fuel Paste Discharging System, and a Metal-Fuel Paste Loading System. The Metal-Paste Holder comprises a container 801 including a paste-compartment 803 (disposed within the container 801) that holds metal anode material in fluid form (for example, formed by suspending particles of metal in a fluid electrolyte, such as KOH and varying additives, to thereby form a paste-like substance). The paste-compartment 803 can be moved within the container 801 such that the paste stored therein is exposed to a discharging head assembly comprising at least one anode-contacting element 805 and cathode structure 807 via a first-aperture 809 and second-aperture 811 formed in the container structure. Preferably, the paste-compartment 803 is formed by a pair of walls 813,815 fixed apart by one or more supporting members 817 (one shown). In addition, the geometry of the walls 813,815 fit the inner surface of the container 801 to allow rectilinear movement within the container 801 to thereby expose the metal-fuel paste to the anode-contacting element 805 and cathode structure 807 via the first-aperture 809 and second-aperture 811, respectively. A passage (not shown) is provided to transport ambient air (oxygen) to the cathode-element 825 for discharging operations.

Rectilinear movement of the paste-compartment 803 can be realized by a helical screw 819 coupled to one the walls (for example, wall 813 as shown) and translation therealong by way of an electric motor 819 and gear mechanism. Preferably, the devices are operably connected to the control subsystem 711'. The function of the gear mechanism is to convert rotational movement of the motor shaft into a rectilinear motion necessary for translating the paste-compartment 803 within the container 801.

Preferably, the container 801 and the anode-contacting element 805 and cathode structure 807 of the discharge-head assembly have a modular construction that provides for user-friendly loading and unloading of metal-fuel and/or user-friendly replacement of the cathodes and possibly the anode-contacting elements.

An exemplary modular construction is illustrated in FIG. 7 wherein an upper-housing portion 825 is (releasably) detachable from a lower-housing portion 827. The housing portions 825,827 include grooves 829,831 that form a first-recess when the housing portions 825,827 are attached. The paste-container 801 is manually loaded into the first-recess by sliding the paste-container 801 therein. The container 801 includes the first-aperture 809 and second-aperture 811 that aligns with the anode-contacting element 805 and cathode structure 807 of the discharge-head assembly when the container 801 is inserted to the first-recess.

Preferably, the cathode structure 807 and the anode-contacting element 805 of the discharge head assembly are removable. This may be realized by grooves 833, 835 in the housing portions 825,827, respectively, that form a second-recess when the housing portions 825,827 are attached. The cathode structure 807 and the anode-contacting element 805 are integrated on one or more supporting members (two shown as 821 and 823) that are manually loaded into the second-recess by sliding the supporting member(s) into the second-recess.

The cathode structure 807 preferably includes a nickel mesh fabric embedded within carbon and catalytic material that is mounted over the surface of the supporting member 823 that aligns with the aperture 811 of the container 801 when the container 801 is loaded into the first-recess as shown. In addition, the supporting member 823 includes a passageway 825 that enables transport of air (oxygen) to the cathode structure 825 formed thereon. The anode-contacting element 805 preferably comprises a metal layer formed on the surface of the supporting member 821 that aligns with the aperture 809 of the container 801 when the container 801 is loaded into the first-recess as shown. The cathode structure 825 and the anode-contacting element 823 are electrically-connected to the DC output power bus 706' in the discharge mode of operation.

In the refuel mode of operation, a container 801 storing consumed metal-fuel is manually removed from the first-recess in the housing and a container 801 storing fresh fuel is loaded into the first recess of the housing. Preferably, when loaded, the paste compartment 803 is positioned such that it is not exposed to the discharge head assembly.

During the discharge mode of operation, oxygen-rich air is permitted to flow through the passageway 825 and reach the discharge head assembly. The metal-fuel paste compartment 803 is transported by the Metal-Fuel Paste Loading System such that the metal-fuel paste contained therein is exposed to the discharge head assembly thereby discharging power via the CD output power bus. When operated in this manner, consumed paste material is disposed at the opposite end of the container 801.

The same structures (or similar structures) may be used to realize a Metal-Air Fuel Recharging System wherein power is provided to one or more recharge head assemblies and the metal-paste exposed therein is recharged (e.g., the metal-oxide is converted back to metal and oxygen is emitted from the passageway that vents the cathode structure of the recharge head assemblies).

It should be noted that the Metal-Fuel Tape Discharging Subsystem may include multiple cathode discharging structures as described above. In such system, the cathode structures and anode-contacting elements may terminate at an output power controller that includes circuitry necessary for realizing output power control of the power generated by the multiple discharging cathode assemblies (which selectively controls the power provided to the DC output power bus), the details of which is described in U.S. Patent Application No. PCT/US98/21260, herein incorporated by reference in its entirety.

In addition, it is contemplated that the container 801 and housing (depicted as housing portions 825,827) may embody the reservoir container and fluid transport paths as described in U.S. patent application No. 09/590,798, herein incorporated by reference in its entirety, to thereby provide for a more compact storage of the fresh paste material and consumed paste material. In such a structure, consumed paste material may be transported to a second compartment in the container (disposed at the near-end of the container adjacent to insertion point of the container) via a transport path integral to the housing. In this case, the transport path carries consumed paste material from the far-end of the container adjacent to the discharge head assembly to the second compartment. The volume of the two compartments may vary in an inverse relationship to thereby minimize the space required therein as taught therein.

Applications of the Metal-Air FCB Based Power Supply Unit of the Present Application Only a few illustrative embodiment of the present invention have been described above. Numerous other embodiments of the present invention may be practiced by others having the benefit of the present disclosure and novel teachings disclosed therein. In general, the designs, structures, and inventive principles embodied within the system embodiments described above can be used to create various types of metal-air FCB power producing (i.e., generating) modules adapted for use within various electric systems and applications. Examples of such FCB power generating modules comprise, in general: a module housing one or more FCB subsystems into which anode material is loaded for discharging; and wherein the module has a pair of electrical terminals for contacting power terminals of the host system.

Figure 8:
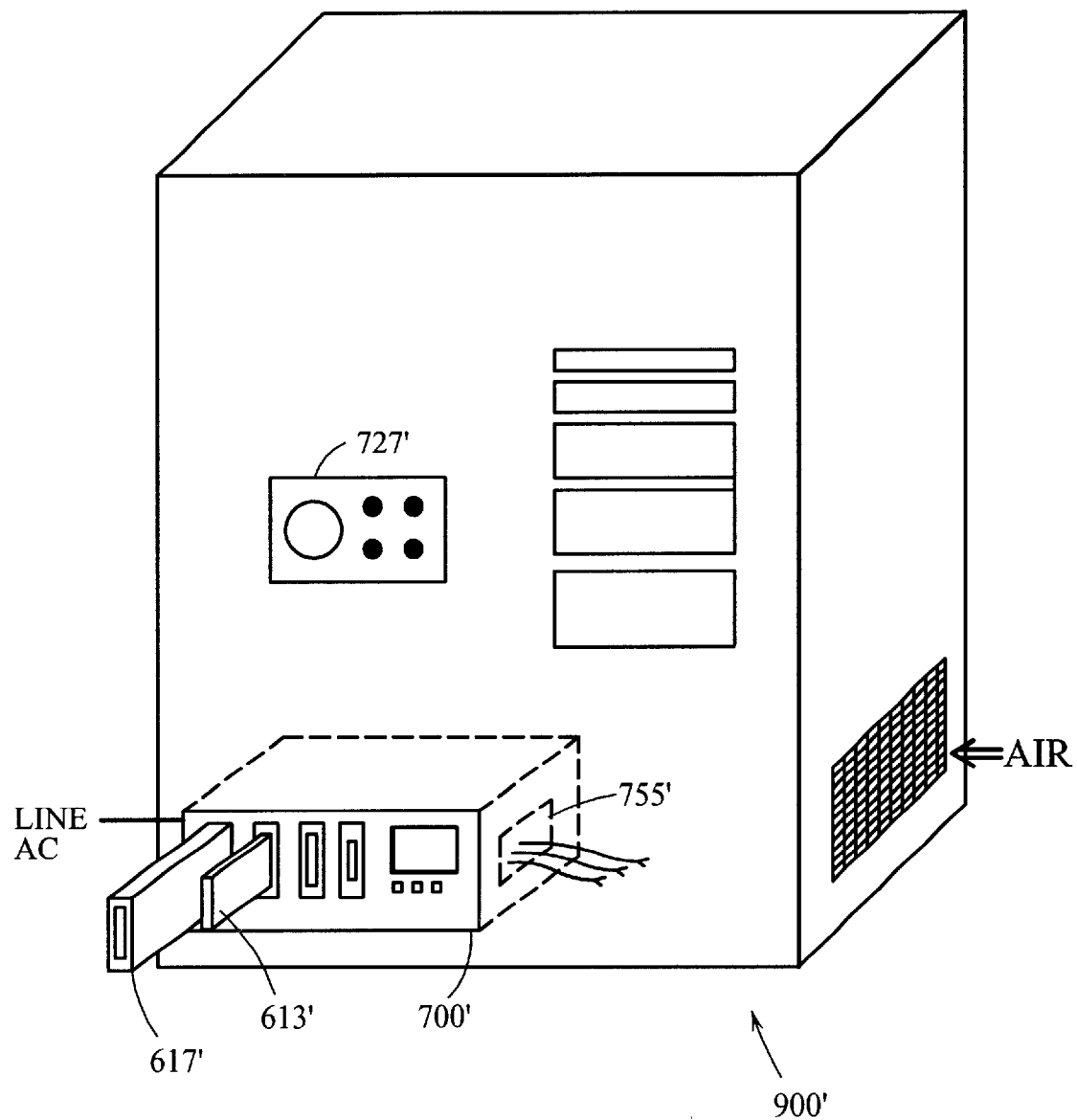
FIG. 8 is a perspective view of a computer processing apparatus (such as a server that provides data processing capabilities to an enterprise) having an integrated refuelable and rechargable metal-air FCB based power supply unit that generates and supplies electrical power to the devices of the apparatus, wherein at least one auxiliary power source is provided for recharging metal-fuel within the FCB subsystems thereof, and wherein the metal-air FCB based power supply unit preferably includes at least one recess for slidably inserting and removing metal-fuel used therein and for slidably inserting and removing cathode structures used therein.

Devices/Systems with the Integrated Metal-air FCB Based Power Supply Unit of the Present Invention In FIG. 8, there is shown a computer processing apparatus 900' (for example, a server providing processing capability to an enterprise) having an integrated metal-air FCB based power supply unit 700'. Line AC power is supplied to the power supply unit 700'. The output port 755' of the integrated metal-air FCB based power supply provides regulated power to the various devices (motherboard, CPU memory, hard disk drive, floppy disk drive, optical drive, peripheral devices, etc) of the computer processing apparatus. In this application, the metal-air FCB based power supply unit 700' provides the functionality of an integrated UPS system for the computer processing apparatus. As shown in FIG. 8, the metal-air FCB based power supply unit 700' has a plurality of recesses for slidably removing and loading replacement cathode structures 617' and/or replacement metal-fuel anode cards 613' into the system 900'.

Similarly, the apparatus 900' of FIG. 8 may comprise a television, audio equipment, washing machine, refrigerator, freezer, oven, stove, furnace, air conditioner, an electrically-powered tool, or any other home/garden appliance. In such systems, the output port 755' of the integrated metal-air FCB based power supply provides regulated power to the various devices of the apparatus.

Figure 9:
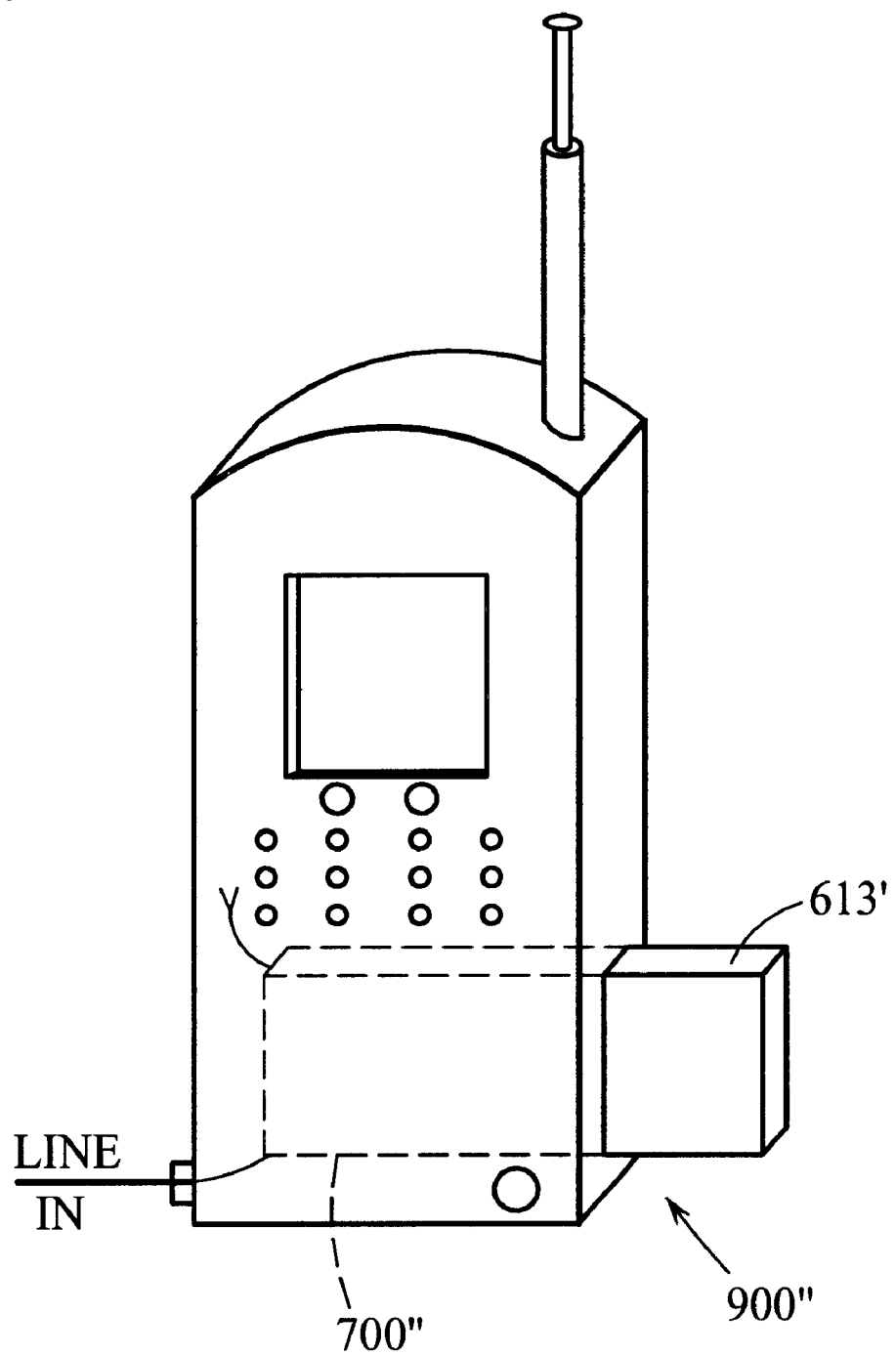
FIG. 9 is a perspective view of a portable electronics device (such as a wireless communication device) having an integrated refuelable and rechargable metal-air FCB based power supply unit that generates and supplies electrical power to the devices disposed therein, wherein the metal-air FCB based power supply unit includes at least one auxiliary power source for recharging metal-fuel within the FCB subsystems thereof, and wherein the metal-air FCB based power supply unit preferably includes a recess for slidably inserting and removing metal-fuel used therein.

In FIG. 9, there is shown a portable appliance 900" (for example, a wireless communication device) having an integrated metal-air FCB based power supply unit 700". An external power source (Line In) is supplied to the power supply unit 700". The output port 755' (not shown) of the integrated metal-air FCB based power supply provides regulated power to the various components (wireless communication chipsets, memory, controller, LCD screen, keypad, etc) of the device. In this application, the metal-air FCB based power supply unit 700" provides the functionality of an integrated UPS system for the device. As shown in FIG. 9, the metal-air FCB based power supply unit 700" has recesses (one shown) for slidably removing and loading replacement metal-fuel anode cards 613' (and, possibly replacement cathode structures 617') into the device 900". Note that the power supply unit 700" can be portable (as shown) so that it can be used as an alternate source of power for multiple portable devices as needed. However, note that the overall size of the module 700" in any particular application need not be any larger that the dimensions of the compartment to which it is to be installed, which includes hand-held devices and the like.

Similarly, the apparatus 900' of FIG. 9 may comprise a radio, disc player, other music playing devices, television, camcorder, other video playing/recording devices, telephone, PDA, other communication devices, or any other portable electronic device. In such devices, the output port 755' of the integrated metal-air FCB based power supply provides regulated power to the various components of such devices.

Advantageously, devices/systems having an integrated metal-air FCB based power supply unit as described above provide improved efficiency and reliability over prior art devices/systems. More specifically, in the event that a prolonged interruption occurs in the power delivered by an external power source, such devices/systems can be used without prolonged interruption by refueling the metal-air FCB based power supply unit integrated therein, if need be. Moreover, the environmental and safety hazards, costs, unfriendly noises and other limitations associated with the prior forms of auxiliary power generation (based upon conventional battery technology and combustible fuel) are avoided. In addition, the metal-air FCB subsystem of the present invention preferably embodied therein provides a modular architecture to enable flexible and user-friendly operations in loading of metal-fuel, unloading of consumed metal-fuel, replacement of the ionic-conducting medium, and replacement of the cathode structures of the metal-air FCB cells.

Figure 10:
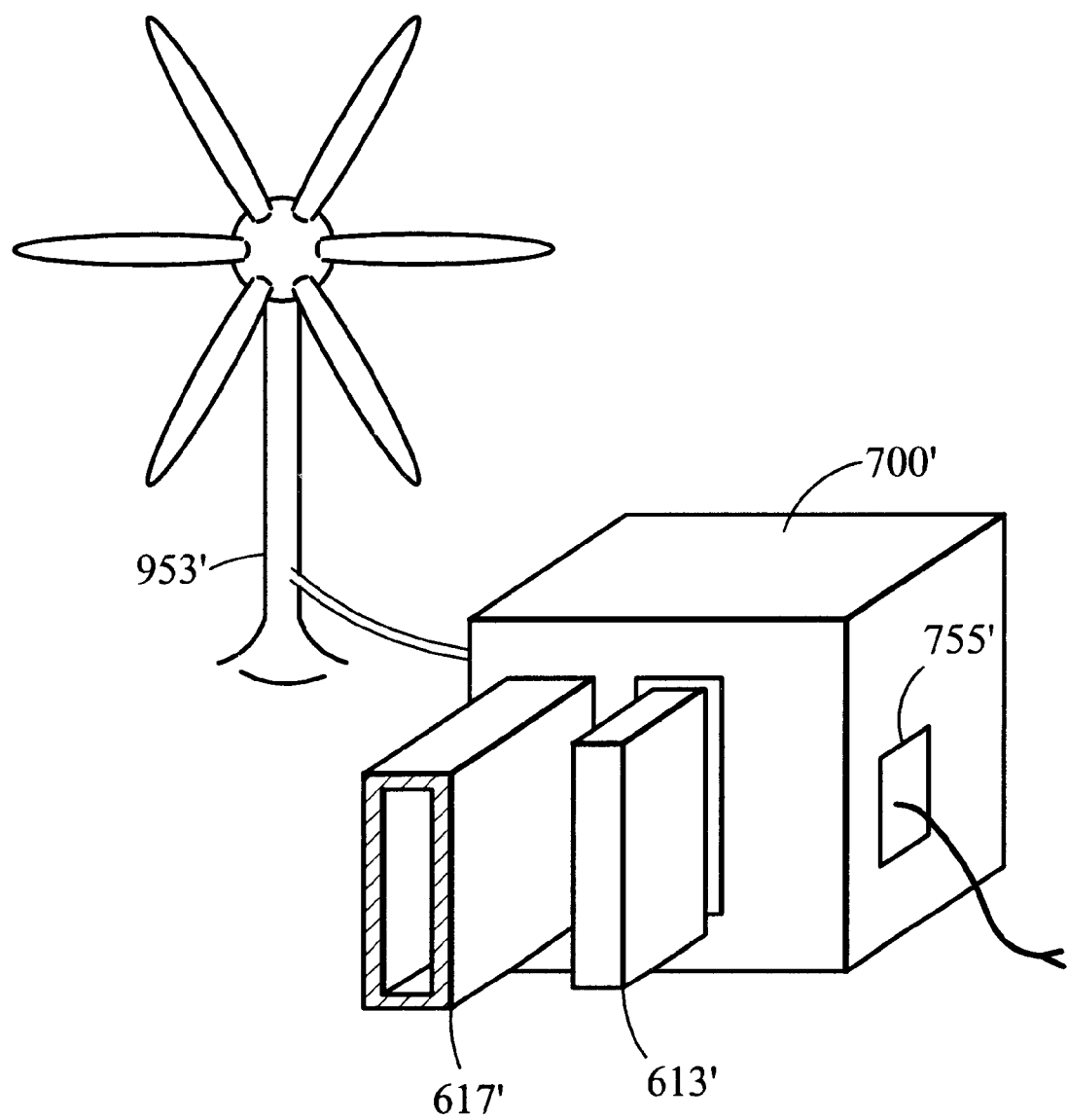
FIG. 10 is a perspective view of an electrical power generation system of the present invention including a refuelable and rechargable metal-air FCB based power supply unit that generates and supplies electrical power to one or more electrical power-consuming load devices, wherein an interruptible auxiliary power source(s) is provided for recharging metal-fuel within the FCB subsystems thereof, and wherein the metal-air FCB based power supply unit preferably includes at least one recess for slidably inserting and removing metal-fuel used therein and for slidably inserting and removing cathode structures used therein.

Uninterruptible Power Generation and Distribution Systems with a Metal-air FCB Based Power Supply Unit In FIG. 10, there is shown an uninterruptible power generation system 950' including an interruptible power source 953' (which may be wind-driven power generator as shown, or a solar-based power generator, or a hydroelectric generation system) coupled to a metal-air FCB based power supply unit 700'. The power supply unit 700' is electrically coupled to the one or more electrical power-consuming load devices 751' via an output port 755'. As shown in FIG. 10, the metal-air FCB based power supply unit 700' has a plurality of recesses for slidably removing and loading replacement cathode structures 617' and/or metal-fuel anode cards 613' into the system 900'.

Figure 11:
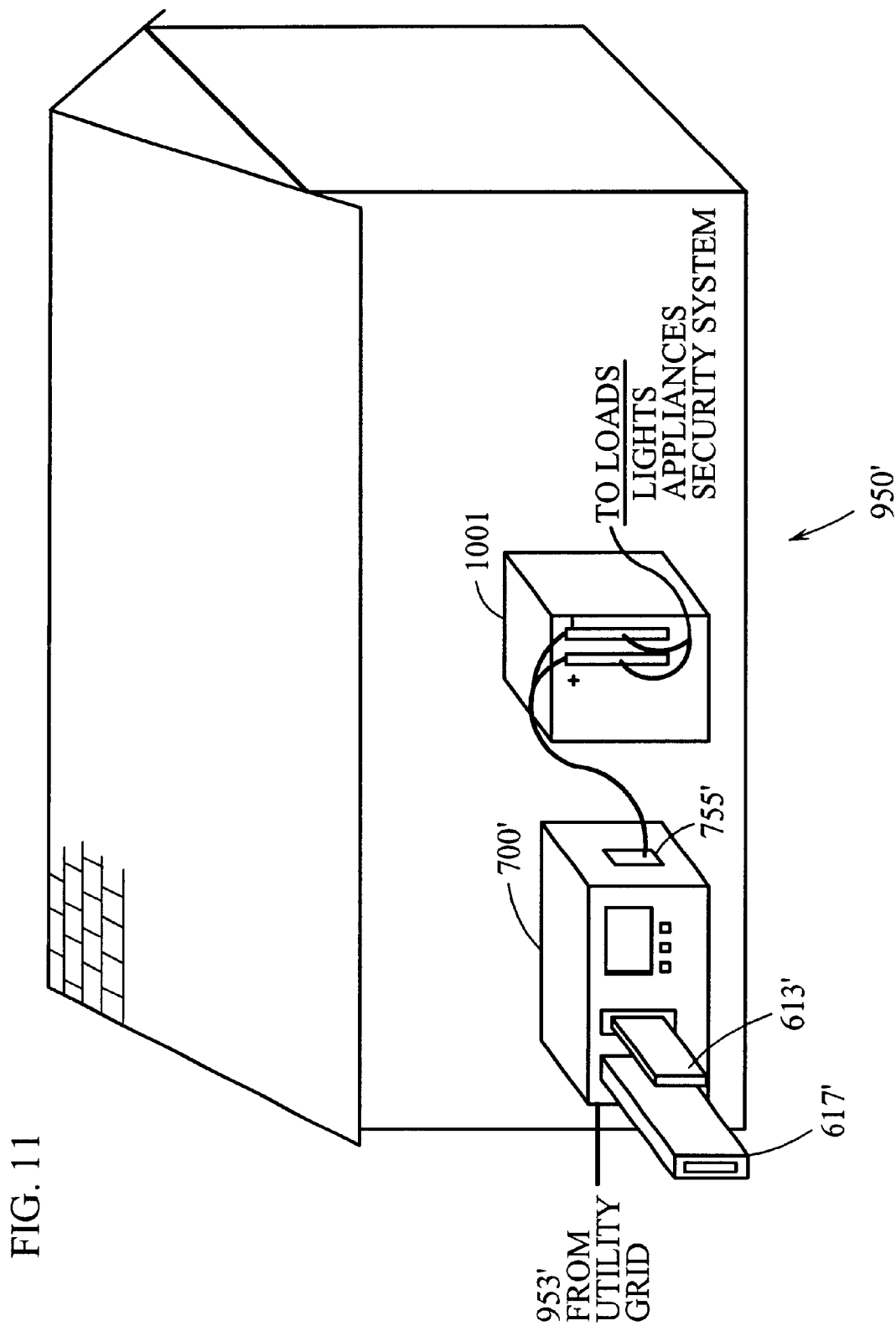
FIG. 11 is a perspective view of a building, wherein the electrical power distribution system of the present invention is interfaced to the power distribution panel of the building; the electrical power distribution system includes a refuelable and rechargable metal-air FCB based power supply unit that generates and supplies electrical power to the electrical power-consuming load devices of the building, wherein an interruptible auxiliary power source(s) is provided for recharging metal-fuel within the metal-air FCB subsystems thereof, and wherein the metal-air FCB based power supply unit preferably includes at least one recess for slidably inserting and removing metal-fuel used therein and for slidably inserting and removing cathode structures used therein.

In FIG. 11, there is shown an uninterruptible power distribution system 950' (for example, in a residence) including an interruptible power source 953' (the utility maintained power grid) coupled to a metal-air FCB based power supply unit 700'. The output port 755' of the power supply unit 700' is electrically coupled to the terminals (bus bars) of a power distribution panel 1001 providing power distribution to the electrical power-consuming loads (outlets, lights, appliances, security and fire systems) of the building. As shown in FIG. 11, the metal-air FCB power producing module 700' has a plurality of recesses for slidably removing and loading replacement cathode structures and/or replacement metal-fuel anode cards 613' into the system.

Advantageously, uninterruptible power generation and distribution systems with a metal-air FCB based power supply unit as described above provide improved efficiency and flexibility over prior art power generation systems. More specifically, in the event that a prolonged interruption occurs in the power delivered by an interruptible power source, the power generation and distribution system of the present invention can be used without prolonged interruption by refueling the metal-air FCB based power supply unit integrated therein, if need be. Moreover, the environmental and safety hazards, costs, unfriendly noises and other limitations associated with the prior art forms of auxiliary power generation (based upon conventional battery technology and combustible fuel) are avoided. In addition, the metal-air FCB subsystem of the present invention preferably embodied therein provides a modular architecture to enable flexible and user-friendly operations in loading of metal-fuel, unloading of consumed metal-fuel, replacement of the ionic-conducting medium, and replacement of the cathode structures of the metal-air FCB cells.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. An appliance for use with an external power source, the appliance comprising:
    a system housing with at least one electrical-energy-consuming load device disposed therein;
    a refuelable and rechargeable power supply unit integrated into the system housing, the power supply unit comprising:
        a metal-air fuel cell battery subsystem comprising at least one metal-air fuel cell capable of generating and storing electrical power, wherein consumed metal-fuel is unloaded from and metal fuel loaded into the metal-air fuel cell battery subsystem to thereby refuel the metal-air fuel cell battery subsystem; and
        a controller that enables electrical connection from the metal-air fuel cell battery subsystem to the electrical power-consuming load device in a discharging mode to thereby supply electrical power to the electrical power-consuming load device, that enables electrical connection from the external power source to the metal-air fuel cell battery subsystem in a recharging mode to thereby recharge the metal-air fuel cell battery subsystem, and that identifies at least a portion of consumed metal-fuel to be refueled.

2. The appliance of claim 1, wherein electrical power provided to the electrical power-consuming load device is supplied solely by the metal-air fuel cell battery subsystem.

3. The appliance of claim 2, wherein electrical power provided to the electrical power-consuming load device is supplied solely by electrical power generated by the metal-air fuel cell battery subsystem operating in discharging mode.

4. The appliance of claim 1, further comprising an input power bus and output power bus both coupled to the metal-air fuel cell battery subsystem, wherein the input power bus provides an electrical connection from the external power source to the metal-fuel cell battery subsystem in the recharging mode to thereby recharge the metal-air fuel cell battery system, and wherein the output power bus provides an electrical connection from the metal-fuel cell battery subsystem to said electrical power-consuming load device in the discharging mode to thereby provide electrical power to the electrical power-consuming load device.

5. The appliance of claim 4, wherein the metal-air fuel cell battery subsystem comprises a network of metal-air fuel cell modules each comprising a plurality of metal-air fuel cells, wherein the network of metal-air fuel cell modules includes a first set of modules distinct from a second set of modules; and wherein said controller operates the first set of modules in discharging mode to thereby supply electrical power from the first set of modules to said electrical power-consuming load device via the output power bus concurrent with operation of the second set of modules in recharging mode to thereby recharge the second set of modules with electrical power supplied from the external power source via the input power bus.

6. The appliance of claim 4, wherein the metal-air fuel cell battery subsystem comprises a plurality of metal-air fuel cells including a first set of metal-air fuel cells distinct from a second set of fuel cells; and said controller operates the first set of fuel cells in discharging mode to thereby supply electrical power from the first set of fuel cells to said electrical power-consuming load device via the output power bus concurrent with operation of the second set of fuel cells in recharging mode to thereby recharge the second set of fuel cells with electrical power supplied from the external power source via the input power bus.

7. The appliance of claim 1, wherein the system housing includes recesses into which metal-fuel is manually loaded into the metal-air fuel cell battery subsystem and from which consumed metal-fuel is manually unloaded from the metal-air fuel cell battery subsystem.

8. The appliance of claim 7, wherein the metal-fuel is disposed on a card structure that is manually loaded into and unloaded from the recesses.

9. The appliance of claim 8, wherein the card structure comprises a plurality of distinct metal-fuel elements integrated therein.

10. The appliance of claim 7, wherein the metal-fuel is disposed in a cartridge that is that is manually loaded into and unloaded from the recesses.

11. The appliance of claim 10, wherein the cartridge holds metal-fuel tape.

12. The appliance of claim 10, wherein the cartridge holds sheets of metal-fuel.

13. The appliance of claim 10, wherein the cartridge stores a paste including anode material particles suspended in a liquid ionically-conducting medium.

14. The appliance of claim 1, wherein the appliance comprises a computer processing apparatus.

15. The appliance of claim 1, wherein the appliance comprises a portable electronic device.

16. The appliance of claim 15, wherein the portable electronic device is one of the following: radio, disc player, other portable music playing devices, camcorder, other video playing/recording devices, telephone, PDA, other communication devices.

17. The appliance of claim 1, where the appliance comprises one of the following: television, audio equipment, washing machine, refrigerator, freezer, oven, stove, furnace, air conditioner.

18. The appliance of claim 1, wherein the appliance comprises an electrically-powered tool.

19. The appliance of claim 1, wherein the external power source comprises a public electric utility grid.

20. The appliance of claim 1, wherein the external power source derives energy from a public utility grid.

21. The appliance of claim 1, wherein the external power source comprises a wind-driven power generator.

22. The appliance of claim 1, wherein the external power source comprises a generator that derives energy from solar energy.

23. The appliance of claim 4, further comprising an switching network, coupled to the input power bus, the output power bus, and the power terminals of a plurality of metal-air fuel cell battery subsystems that operates, in response to control signals from said controller, to: selectively couple the input power bus to the power terminals of one or more of the plurality of metal-air fuel cell battery subsystems; to selectively couple the output power bus to the power terminals of one or more of the plurality of metal-air fuel cell battery subsystems; and to selectively couple together the power terminals of two or more of the metal-air fuel cell battery subsystems.

24. A method for operating an appliance comprising a system housing with at least one electrical-energy-consuming load device disposed therein, the method comprising the steps of:

providing a power supply unit integrated into the system housing, the power supply unit having a metal-air fuel cell battery subsystem disposed within a modular housing, the metal-air fuel cell battery subsystem comprising at least one metal-air fuel cell capable of generating and storing electrical power, and wherein consumed metal-fuel is unloaded from and metal-fuel is loaded into the metal-air fuel cell battery subsystem to thereby refuel the metal-air fuel cell battery subsystem; and providing a control subsystem that operates in a discharging mode to enable electrical connection from the metal-fuel cell battery subsystem to the electrical power-consuming load device to thereby supply electrical power to the electrical power-consuming load device, that operates in a recharging mode to enable electrical connection from an external power source to the metal-fuel cell battery to thereby recharge the metal-air fuel cell battery subsystem, and that identifies at least a portion of consumed metal-fuel to be refueled.

25. The method of claim 24, wherein electrical power provided to the electrical power-consuming load device is supplied solely by electrical power supplied by the metal-air fuel cell battery subsystem.

26. The method of claim 25, wherein electrical power provided to the electrical power-consuming load device is supplied solely by electrical power generated by discharging the metal-air fuel cell battery subsystem.

27. The method of claim 24, further comprising an input power bus and output power bus both coupled to the metal-air fuel cell battery subsystem, wherein the input power bus provides an electrical connection from the external power source to the metal-fuel cell battery subsystem in the recharging mode to thereby recharge the metal-air fuel cell battery system, and wherein the output power bus provides an electrical connection from the metal-fuel cell battery subsystem to said electrical power-consuming load device in the discharging mode to thereby provide electrical power to the electrical power-consuming load device.

28. The method of claim 27, wherein the metal-air fuel cell battery subsystem comprises a network of metal-air fuel cell modules each comprising a plurality of metal-air fuel cells, wherein the network of metal-air fuel cell modules includes a first set of modules distinct from a second set of modules; and wherein said controller operates the first set of modules in discharging mode to thereby supply electrical power from the first set of modules to said electrical power-consuming load device via the output power bus concurrent with operation of the second set of modules in recharging mode to thereby recharge the second set of modules with electrical power supplied from the external power source via the input power bus.

29. The method of claim 27, wherein the metal-air fuel cell battery subsystem comprises a plurality of metal-air fuel cells including a first set of metal-air fuel cells distinct from a second set of fuel cells; and said controller operates the first set of fuel cells in discharging mode to thereby supply electrical power from the first set of fuel cells to said electrical power-consuming load device via the output power bus concurrent with operation of the second set of fuel cells in recharging mode to thereby recharge the second set of fuel cells with electrical power supplied from the external power source via the input power bus.

30. The method of claim 24, wherein said system housing includes recesses into which metal-fuel is manually loaded into the metal-air fuel cell battery subsystem and from which metal-fuel is manually unloaded from the metal-air fuel cell battery subsystem.

31. The method of claim 30, wherein the metal-fuel is disposed on a card structure that is manually loaded into and unloaded from the recesses.

32. The method of claim 31, wherein the card structure comprises a plurality of distinct metal-fuel elements integrated therein.

33. The method of claim 30, wherein the metal-fuel is disposed in a cartridge that is that is manually loaded into and unloaded from the recesses.

34. The method of claim 33, wherein the cartridge holds metal-fuel tape.

35. The method of claim 33, wherein the cartridge holds sheets of metal-fuel.

36. The method of claim 33, wherein the cartridge stores a paste including anode material particles suspended in a liquid ionically-conducting medium.

37. The method of 24, wherein the appliance comprises a computer processing apparatus.

38. The method of 24, wherein the appliance comprises a portable electronic device.

39. The method of claim 38, wherein the portable electronic device is one of the following: radio, disc player, other portable music playing devices, camcorder, other video playing/recording devices, telephone, PDA, other communication devices.

40. The method of 24, where the appliance comprises one of the following: television, audio equipment, washing machine, refrigerator, freezer, oven, stove, furnace, air conditioner.

41. The method of 24, wherein the appliance comprises an electrically-powered tool.

42. The method of 24, wherein the external power source comprises a public electric utility grid.

43. The method of 24, wherein the external power source derives energy from a public utility grid.

44. The method of 24, wherein the external power source comprises a wind-driven power generator.

45. The method of 24, wherein the external power source comprises a generator that derives energy from solar energy.

46. The method of claim 28, further comprising the step of:
operating a switching network coupled to the input power bus, the output power bus, and the power terminals of a plurality of metal-air fuel cell battery subsystems, in response to control signals from said controller, to: selectively couple the input power bus to the power terminals of one or more of the plurality of metal-air fuel cell battery subsystems; to selectively couple the output power bus to the power terminals of one or more of the plurality of metal-air fuel cell battery subsystems; and to selectively couple together the power terminals of two or more of the metal-air fuel cell battery subsystems.

* * * * *